US006816659B2

(12) United States Patent  (10) Patent No.: US 6,816,659 B2
Gorni et al.  (45) Date of Patent: Nov. 9, 2004

(54) UNIT FOR COMPENSATING THE CHROMATIC DISPERSION IN A RECONFIGURABLE MANNER

(75) Inventors: Giacomo Gorni, Pavia (IT); Luciano Socci, Milan (IT); Marco Romagnoli, Milan (IT)

(73) Assignee: Pirelli Cavi E Sistemi S.p.A., Milano (IT)

( * ) Notice: Subject to any disclaimer, the term of this patent is extended or adjusted under 35 U.S.C. 154(b) by 0 days.

(21) Appl. No.: 10/180,461

(22) Filed: Jun. 27, 2002

(65) Prior Publication Data

US 2003/0142939 A1 Jul. 31, 2003

Related U.S. Application Data

(60) Provisional application No. 60/303,339, filed on Jul. 9, 2001.

(30) Foreign Application Priority Data

Jun. 29, 2001 (EP) .............................................. 01202513

(51) Int. Cl.⁷ ................................................. G02B 6/20
(52) U.S. Cl. ....................................... 385/125; 385/123
(58) Field of Search ................................ 385/123–128, 385/24; 398/81, 147, 148, 159

(56) References Cited

U.S. PATENT DOCUMENTS

| 5,793,917 A | * | 8/1998 | Yoshimura | 385/100 |
| 5,802,236 A | * | 9/1998 | DiGiovanni et al. | 385/127 |
| 6,339,665 B1 | * | 1/2002 | Danziger | 385/123 |
| 6,393,178 B2 | * | 5/2002 | Ranka et al. | 385/28 |
| 6,445,862 B1 | * | 9/2002 | Fajardo et al. | 385/125 |
| 6,574,404 B2 | * | 6/2003 | Sasaoka et al. | 385/123 |
| 2001/0051031 A1 | * | 12/2001 | Hada et al. | 385/123 |
| 2002/0006257 A1 | * | 1/2002 | Danziger et al. | 385/123 |
| 2002/0181878 A1 | * | 12/2002 | Schneider et al. | 385/50 |

FOREIGN PATENT DOCUMENTS

| JP | 09023187 A | * | 1/1997 | .......... H04B/10/02 |
| WO | WO 02/06874 | | 1/2002 | |

OTHER PUBLICATIONS

"Dispersion Compensation using single material fibers", Birks et al, IEEE Photonics technology letters, vol. 11, No. 6, Jun. 199.*
Agarwal, "Nonlinear Fiber Optics", Second Edition, Academic Press, N.Y., pp. 8–11, (1995).
Eggleton, B.J. et al., "Tunable Dispersion Compensation in a 160–Gb/s TDM System by a Voltage Controlled Chirped Fiber Bragg Grating", IEEE Photonics Technology Letters, vol. 12, No. 8, pp. 1022–1024, (Aug. 2000).
Abramov, A.A. et al., "Electrically Tunable Efficient Broad–Band Fiber Filter", IEEE Photonics Technology Letters, vol. 11, No. 4, , pp. 445–447, (Apr. 1999).
Birks, T.A. et al., "Dispersion Compensation Using Single–Material Fibers", IEEE Photonics Technology Letters, vol. 11, No. 6, pp. 674–676, (Jun. 1999).
Vohra, S. T. et al., "Dynamic Dispersion Compensation Using Bandwidth Tunable Fiber Bragg Gratings", U.S. Naval Research Laboratory, Optical Science Division, ECOC, pp. 113–114, (2000).

(List continued on next page.)

*Primary Examiner*—Hemang Sanghavi
*Assistant Examiner*—Scott Alan Knauss
(74) *Attorney, Agent, or Firm*—Finnegan, Henderson, Farabow, Garrett, & Dunner, L.L.P.

(57) ABSTRACT

Unit (100) comprising a portion of holey optical fibre (12) having a length Lc comprising a core region (13) and a cladding region (14), said cladding region (14) comprising, in turn, a plurality of holes passing through it longitudinally, said holes having a respective diameter and being spaced, two by two, according to a respective pitch, said unit comprising also a temperature adjusting device (16) for bringing and maintaining the holey optical fibre (12) at temperature values T selectable in a predetermined interval of temperatures Tx-Ty.

28 Claims, 6 Drawing Sheets

OTHER PUBLICATIONS

Kashiwada, T. et al., "Broadband Dispersion Compensating Module Considering Its Attenuation Spectrum Behavior For WDM System", OFC '99, WM12, pp. 229–231, (1999).

Berkey, G.E. et al., "Negative Slope Dispersion Compensating Fibers", OFC '99, WM14, pp. 235–237, (1999).

Grüner–Nielsen, L. et al., "Design and Manufacture of Dispersion Compensating Fibre for Simulaneous Compensation of Dispersion and Dispersion Slope", OFC '99, Technical Digest WM13, pp. 232–234; (1999).

Silvestre, E. et al., "Biorthonormal–Basis Method for the Vector Description of Optical–Fiber Modes", Journal of Lightwave Technology, vol. 16, No. 5, pp. 923–928, (May 1998).

Ferrando, A. et al., "Full–Vector Analysis of a Realistic Photonic Crystal Fiber", Optics Letters, vol. 24, No. 5, pp. 276–278, (Mar. 1, 1999).

* cited by examiner

UNIT FOR COMPENSATING THE CHROMATIC DISPERSION IN A RECONFIGURABLE MANNER

CROSS REFERENCE TO RELATED APPLICATIONS

This application claims the benefit of U.S. Provisional Application No. 60/303,339, filed Jul. 9, 2001, the content of which is incorporated herein by reference, and claims the right to priority based on European Application No. 01202513.6, filed Jun. 29, 2001.

BACKGROUND OF THE INVENTION

1. Field of the Invention

The present invention relates to a reconfigurable unit for compensating the chromatic dispersion, and optionally, the chromatic dispersion slope, comprising a holey optical fibre and a temperature adjusting device.

Moreover, the present invention relates to an optical communication line and an optical communication system comprising such unit, and a method for compensating chromatic dispersion, and optionally, the chromatic dispersion slope, in a reconfigurable manner.

In the present description and claims, the expression:

"chromatic dispersion coefficient D" is used to indicate the dependence at the first order of group velocity on the wavelength. More in particular, the chromatic dispersion coefficient D is expressed by the following relation (Govind P. Agrawal, "Nonlinear Fiber Optics—Second Edition", Academic Press, pages 8–10)

$$D = \frac{d\beta_1}{d\lambda} = -\frac{2\pi c}{\lambda^2}\beta_2$$

where $\beta_1$ and $\beta_2$ are the propagation constants of the first and second order, respectively, and D is expressed in ps/(nm*Km). Moreover, the chromatic dispersion coefficient D can have a positive or negative value based on the sign of the propagation constant $\beta_2$;

"chromatic dispersion D*L" is used to indicate the chromatic dispersion, expressed in ps/nm, accumulated along an optical transmission fibre having a chromatic dispersion coefficient D, expressed in ps/(nm*Km), and a length L, expressed in Km (such product D*L can have a positive or negative value according to whether the chromatic dispersion coefficient D is positive or negative);

"chromatic dispersion slope s" is used to indicate the derivative, with respect to the wavelength, of the chromatic dispersion coefficient D, is expressed in ps/(nm²*Km) and can have a positive or negative value; and "optical transmission fibre" is used to indicate an optical fibre used in an optical communication line or system for transmitting optical signals from a point to the other, located at a considerable distance (for example, at at least some km or tenths of km).

2. Description of the Related Art

In the field of optical telecommunications and optical signal propagation in an optical transmission fibre, chromatic dispersion (or second order dispersion), defined by the above chromatic dispersion coefficient D, is a phenomenon for which different spectral components of a light pulse propagating in an optical fibre travel at different speeds, causing a temporal broadening of the pulse.

In an optical communication system, chromatic dispersion thus limits the maximum data transmission speed (that is, the bit rate) or the maximum connection length without electrical signal regeneration.

In order to compensate chromatic dispersion Dt*Lt accumulated along an optical transmission fibre having a chromatic dispersion coefficient Dt and a length Lt, there are known devices comprising, for example, an optical fibre specifically designed to have a very high value of the chromatic dispersion coefficient Dc, with opposed sign with respect to that of the optical transmission fibre, and such length Lc as to satisfy the relation Dt*Lt=−Dc*Lc.

However, a compensator device of this type, designed so as to compensate a certain value of chromatic dispersion Dt*Lt, is not suitable for compensating the chromatic dispersion of another optical transmission fibre characterised by a different value of product Dt*Lt with respect to that for which the compensator device has been designed.

For example, a compensator device designed to compensate exactly the chromatic dispersion accumulated along a span of 100 Km (Lt=100 Km) of a conventional single mode optical fibre (or SMF) having a value of the chromatic dispersion coefficient Dt equal to about 17 ps/(nm*Km) is not capable of compensating exactly the chromatic dispersion of spans of the same SMF fibre having, however, a length different from 100 Km (for example, 70, 80, 90 or 110 Km).

Moreover, a compensator device designed to compensate exactly the chromatic dispersion accumulated along a span of 100 Km of a conventional SMF fibre is not capable of compensating exactly the chromatic dispersion accumulated along such span of 100 km in case of variations of the chromatic dispersion coefficient Dt of the SMF fibre with respect to the nominal value due, for example, to the variation of system parameters, such as temperature.

Even though in this latter case the variation of the value of chromatic dispersion Dt*Lt of the optical transmission fibre generally is irrelevant in an optical communication system with moderate bit rates, it becomes very important at high bit rates (2,5, 10, 40, 80 Gbit/s), at which an increasingly higher precision of the chromatic dispersion compensation is required.

There is thus the need for a unit for compensating the chromatic dispersion, suitable to be reconfigured so as to compensate, according to requirements, different values of chromatic dispersion Dt*Lt accumulated along an optical transmission fibre.

B. J. Eggleton et al. ("*Tunable dispersion compensation in a 160-Gb/s TDM system by a voltage controlled chirped fiber Bragg grating*", IEEE Photonics Technology Letters, Vol. 12, No. 8, August 2000, pages 1022–1024) describe an integrated chirp-tunable Bragg grating for compensating chromatic dispersion in a dynamic manner and capable of recovering 2 ps pulses over a 50 ps/nm tuning interval, with a system penalty that is less than 1.3 dB.

S. T. Vohra et al ("*Dynamic dispersion compensation using bandwidth tunable fiber Bragg gratings*", ECOC 2000) describe a device for compensating chromatic dispersion in a tunable manner, realised with a fibre Bragg grating and capable of compensating chromatic dispersion in a tuning interval from −150 ps/nm to −3500 ps/nm.

However, the above devices are not capable of compensating also the third order dispersion or chromatic dispersion slope (or slope) according to which light pulses at different wavelength propagate in an optical fibre with different dispersions.

This phenomenon, caused by the chromatic dispersion being a phenomenon depending on the wavelength, is a problem in wavelength division multiplexing (or WDM) optical communication systems, where information is carried along the same optical fibre by a plurality of optical signals at different wavelength.

Thus, in WDM optical communication systems, it is necessary to compensate not only chromatic dispersion but also chromatic dispersion slope in the interval of wavelengths of interest.

Devices for compensating both chromatic dispersion and chromatic dispersion slope of a conventional single mode fibre (or SMF) are known.

For example, to compensate both a chromatic dispersion coefficient Dt and a chromatic dispersion slope st, there are known devices comprising an optical fibre specifically designed to have very high values of the chromatic dispersion coefficient Dc and of chromatic dispersion slope sc, with opposed sign with respect to those of the SMF optical fibre of which dispersion is to be compensated, so that relation Dt/st=Dc/sc is satisfied (T. Kashiwada et al., "Broadband dispersion compensating module considering its attenuation spectrum behavior for WDM system", OFC '99, WM12, pages 229–231; G. E. Berkey et al., "Negative slope dispersion compensating fibers", OFC '99, WM14, pages 235–237 and L. Gruner-Nielsen et al., "Design and manufacture of dispersion compensating fibre for simultaneous compensation of dispersion and dispersion slope", OFC '99, Technical Digest WM13, pages 232–234).

In fact, it is known that both the following relations must be satisfied for compensating both the chromatic dispersion coefficient Dt and the chromatic dispersion slope st $$Dt*Lt+Dc*Lc=0$$

$$st*Lt+sc*Lc=0$$

that is, the Dt/st ratio must be equal to the Dc/sc ratio.

Moreover, the dispersive properties of a holey optical fibre have been studied in recent years.

A holey optical fibre typically consists of a single material in which the refractive index difference between core and cladding, which allows guided propagation, is obtained through the presence of holes in the cladding, which lower the refractive index of the material forming the fibre.

More in particular, a holey optical fibre has a cladding region comprising holes that run along the entire fibre length, and a solid core region determined by the absence of at least one hole in the material.

For example, U.S. Pat. No. 5,802,236 patent describes a micro-structured optical fibre which includes a solid silica core region surrounded by a inner cladding region and an outer cladding region. The cladding region has capillary holes that extend in the axial direction of the fibre. The holes in the outer cladding region are of a smaller diameter than the holes in the inner cladding region and therefore the effective refractive index of the outer cladding region is greater than the effective refractive index of the inner cladding region. This document states that this type of fibre may have high negative values of the chromatic dispersion coefficient D (for example, values that are more negative than −300 ps/nm*Km) at a predetermined wavelength (for example, 1550 nm) and high negative values of the chromatic dispersion slope s so that the fibre can carry out a dispersion compensation in a range of wavelengths of 20 nm or more.

However, the above devices suitable for compensating both chromatic dispersion and chromatic dispersion slope of a conventional single mode fibre are not reconfigurable.

SUMMARY OF THE INVENTION

The Applicant has posed the technical problem of compensating both chromatic dispersion and chromatic dispersion slope in a reconfigurable manner.

More in general, the Applicant has posed the technical problem of compensating the chromatic dispersion in a reconfigurable manner.

The Applicant has found that the above technical problems can be solved by a unit comprising a holey optical fibre and a device for adjusting the temperature thereof in a predetermined interval of temperatures.

In fact, observing that the chromatic dispersion coefficient Dc and the chromatic dispersion slope sc of a holey optical fibre vary as the temperature varies, the Applicant has found that a holey optical fibre having length Lc can be used to obtain, as the temperature varies, desired values of chromatic dispersion Dc(T)*Lc and of the Dc(T)/sc(T) ratio.

In a first aspect thereof, therefore, the present invention relates to a unit comprising a portion of holey optical fibre having a length Lc comprising a core region and a cladding region, said cladding region comprising, in turn, a plurality of holes passing through it longitudinally, said holes having a respective diameter and being spaced, two by two, according to a respective pitch, said unit being characterised in that it also comprises a temperature adjusting device for bringing and maintaining the holey optical fibre at temperature values T selectable in a predetermined interval of temperatures Tx-Ty.

In the present description and claims, the term "pitch" is used to indicate the centre-centre distance between two adjacent holes of a holey optical fibre.

Typically, the core region of the holey optical fibre portion is solid.

Advantageously, for compensating chromatic dispersion values Dt*Lt comprised in a predetermined interval of values, in a reconfigurable manner at a preselected wavelength λ, the hole diameter and pitch, the length Lc and the interval of temperature Tx-Ty are selected so that at the preselected wavelength λ, the holey optical fibre has such values of the chromatic dispersion coefficient Dc(T) in function of temperature that, as temperature T varies between value Tx and value Ty, the following relation Dt*Lt=−Dc(T)*Lc is substantially satisfied for all chromatic dispersion values Dt*Lt comprised in said predetermined interval of values.

This advantageously allows compensating, in a reconfigurable manner, and with a single unit, different values of chromatic dispersion Dt*Lt comprised in a predetermined interval of values.

Typically, the diameter and pitch of the holes of the holey optical fibre are selected so that the chromatic dispersion coefficient Dc(T) of the holey fibre is negative. This allows compensating the chromatic dispersion of conventional optical transmission fibres—having a positive chromatic dispersion coefficient Dt—such as, for example, SMF optical fibres produced, for example, by FOS or by CORNING Inc.; True Wave™ (TW), True Wave Plus™ (TW+) or True Wave RS™ (TW RS) optical fibres produced by LUCENT Technology Inc.; large effective area (or LEAF) or LEAF Enhanced optical fibres produced by CORNING Inc., and FreeLight™ optical fibres produced by FOS.

Advantageously, the chromatic dispersion coefficient Dc(T) of the holey optical fibre is negative as temperature T varies between value Tx and value Ty.

Typically, the cladding region of the holey optical fibre portion comprises a first ring of holes around the core region.

Such ring of holes can have any shape. Typically, it has a hexagonal shape. In general, it has a circular symmetry.

Advantageously, the ratio between the area taken by the first ring holes and the total area of the circular crown defined by said first ring of holes is more than 0.5. Preferably, said ratio is more than 0.6. More preferably, it is more than 0.7. In fact, the Applicant has found that the variation, as temperature changes, of the chromatic dispersion coefficient Dc(T) of the holey optical fibre increases as said ratio increases.

Typically, the holes of said first ring have a mean diameter d and are spaced from one another by a mean pitch Λ.

Preferably, the d/Λ ratio is more than 0.7. Preferably, it is more than 0.8. More preferably, it is more than 0.9. In fact, the Applicant has found that the variation, as temperature changes, of the chromatic dispersion coefficient Dc(T) of the holey optical fibre increases as the d/Λ ratio increases.

Moreover, as described in the European patent application number 00830495.8, filed by the Applicant, the mean pitch Λ of the holes of said first ring is advantageously selected through the following relation (H)

$$\Lambda = \frac{\lambda}{n}\left(\frac{1}{1+\frac{1}{2}\frac{d}{\Lambda}}\right) \pm 0.25 \ \mu m$$

where n is the refractive index of the material forming the holey optical fibre core region.

This makes the holey optical fibre to have a high absolute value of the chromatic dispersion coefficient Dc at wavelength λ.

The Applicant has noted that relation H agrees with the corresponding values of Λ obtained solving the Maxwell equations in an interval of wavelengths comprised between 1300 and 1700 nm.

More in particular, relation $$\Lambda = \frac{\lambda}{n}\left(\frac{1}{1+\frac{1}{2}\frac{d}{\Lambda}}\right)$$

provides an optimum approximation (with an error in the range of few nm) of the value of Λ corresponding to a maximum absolute value of Dc around the wavelength of 1550 nm, for a value of d/Λ of at least about 0.7, and for a hexagonal shape of the first ring of holes.

In an embodiment, all the holes of said first ring substantially have the same diameter. Moreover, said holes are substantially equally spaced from one another. This advantageously allows facilitating the fibre production process.

Advantageously, the cladding region also comprises at least a second ring of holes arranged around said first ring of holes.

Said rings of holes can have any shape. Typically, they have a hexagonal shape. In general, they have a circular symmetry.

In an embodiment, the holes of said first and said at least one second ring substantially have the same mean diameter d and are spaced from one another by the same mean pitch Λ. This advantageously allows facilitating the fibre production process.

In an alternative embodiment, the holes of said first ring have a mean diameter that is different from the mean diameter of the holes of said at least one second ring.

Preferably, the holes of said first ring have a greater mean diameter than the mean diameter of the holes of said at least one second ring. In fact, the Applicant has noted that this allows increasing the effective area of the core region of the holey optical fibre.

Typically, said core region of the holey optical fibre portion is made of a silica-based vitreous material.

Typically, also said cladding region of the holey optical fibre portion is made of a silica-based vitreous material.

However, the cladding and core region do not necessarily consist of the same material.

Typically, the holes defined by the cladding region are filled with air. Alternatively, they are filled with another material having a lower refractive index than that of the material forming the core region. For example, such material is a gas. More in particular, a gas that does not chemically interact with the material of the core and cladding region.

Advantageously, wavelength λ is comprised between about 1300 nm and 1700 nm. Preferably, it is comprised between about 1450 nm and 1600 nm. More preferably, it is comprised in the third optical fibre transmission band (that is, between about 1500 nm and 1600 nm). Even more preferably, it is comprised in the typical transmission band of an erbium-doped optical amplifier (that is, between about 1530 nm and 1600 nm).

Advantageously, to reduce its volume, the holey optical fibre is wound on itself and contained in a container.

The temperature adjusting device is thermally connected to said container.

Preferably, in order to allow a good heat conduction from the temperature adjusting device to the holey optical fibre, the container consists of a good temperature conductor material.

Advantageously, temperature Tx is less than temperature Ty. Moreover, the interval of temperatures Tx-Ty can be any interval selected in the interval of temperatures comprised between about −20° C. and 80° C.

Typically, temperature Tx is comprised between about −20 and 20° C.

Typically, temperature Ty is comprised between about 20 and 80° C.

Moreover, the difference between temperature Ty and temperature Tx typically is of at least about 30° C.

To compensate a predetermined value of chromatic dispersion slope st and a predetermined value of chromatic dispersion Dt*Lt, at a preselected wavelength λ and at a preselected temperature Tz comprised in the interval Tx-Ty, the hole diameter and pitch, the length Lc and the interval of temperature Tx-Ty are selected so that at the preselected wavelength λ, the holey optical fibre has such values of the chromatic dispersion slope sc(T) and values of the chromatic dispersion coefficient Dc(T) in function of the temperature, as to satisfy the following relations at temperature Tz $$Dt/st=Dc(Tz)/sc(Tz) \text{ and } Dt*Lt=-Dc(Tz)*Lc.$$

Typically, the diameter and pitch of the holes of the holey optical fibre are selected so that also the chromatic dispersion slope sc of the holey fibre is negative. This allows compensating also the chromatic dispersion slope of conventional optical transmission fibres—having a positive chromatic dispersion slope st—such as, for example, the above SMF, True Wave™, True Wave Plus™, True Wave RS™, LEAF, LEAF Enhanced and FreeLight™ optical fibres.

Advantageously, the chromatic dispersion slope sc(T) of the holey optical fibre is negative as temperature T varies between value Tx and value Ty.

Typically, said ring of holes around the core region of the holey optical fibre substantially defines, around the core region, a circular crown having an inside radius r1 and an outside radius r2 whose values are selected so as to substantially satisfy the following relation (L)

$$r1 \leq \lambda/n \leq r2$$

where n is the refractive index of the material forming the holey optical fibre core region.

As described in the European patent application number 00830495.8, the Applicant has, in fact, found that a holey optical fibre, in which the first ring of holes defines a circular crown having such radiuses r1 and r2 that wavelength λ/n is comprised between values r1 and r2, exhibits a negative chromatic dispersion slope sc.

Advantageously, the mean pitch value Λ substantially satisfies the following relation (C)

$$\frac{\lambda}{n} * \frac{1}{1 + \frac{1}{2}\left(\frac{d}{\Lambda}\right)} \leq \Lambda \leq \frac{\lambda}{n} * \frac{1}{1 - \frac{1}{2}\left(\frac{d}{\Lambda}\right)}$$

In fact, the Applicant has found that the above relation (L) is satisfied when the mean pitch Λ substantially satisfies the following relation (C).

In a preferred embodiment, the unit also comprises a second portion of holey optical fibre having a predetermined length Lc' comprising a core region and a cladding region, said cladding region comprising, in turn, a plurality of holes passing through it longitudinally, said holes having a respective diameter and being spaced, two by two, according to a respective pitch.

In this case, the temperature adjusting device is also advantageously suitable for bringing and maintaining the second holey optical fibre at temperature values T' selectable in a second, predetermined interval of temperatures Tx'-Ty'.

The Applicant has found that the unit according to this embodiment, having two holey optical fibres, has the necessary flexibility to be engineered for compensating not only chromatic dispersion values Dt*Lt comprised in a predetermined interval of values, but also a predetermined ratio Dt/st, as temperatures T and T' vary, in a predetermined manner, in the intervals of temperatures Tx-Ty and Tx'-Ty'.

Typically, the core region of the second holey optical fibre portion is solid.

Advantageously, for compensating chromatic dispersion values Dt*Lt comprised in a predetermined interval of values, in a reconfigurable manner at the preselected wavelength λ, the hole diameter and pitch, the lengths Lc and Lc', and the intervals of temperature Tx-Ty and Tx'-Ty' are advantageously selected so that at the preselected wavelength λ, the first and the second holey optical fibre have such values of the chromatic dispersion coefficient Dc(T) and, respectively, Dc(T'), in function of temperature that, as temperatures T, T' vary, in a predetermined manner, between value Tx and value Ty, and respectively, between value Tx' and Ty', the following relation (K) is substantially satisfied $$Dt*Lt = -[Dc(T)*Lc + Dc(T')*Lc']$$

for all values of chromatic dispersion Dt*Lt comprised in said predetermined interval of values.

To compensate also a predetermined ratio Dt/st between the chromatic dispersion coefficient Dt and a chromatic dispersion slope st, at the preselected wavelength λ and as temperatures T, T' vary, the hole diameter and pitch of the first and second holey fibre, the lengths Lc and Lc' and the intervals of temperature Tx-Ty and Tx'-Ty' are also advantageously selected so that, at the preselected wavelength λ, the first and the second holey optical fibres have such values of the chromatic dispersion slope sc(T) and, respectively, sc(T') and values of the chromatic dispersion coefficient Dc(T) and, respectively, Dc(T') in function of temperatures T and T' that, as temperatures T, T' vary in said predetermined manner between value Tx and value Ty and, respectively, between value Tx' and value Ty', also the following relation (J) is substantially satisfied.

$$\frac{Dt}{st} = \frac{\frac{Dc(T)}{sc(T)}*Lc + \frac{Dc(T')}{sc(T')}*Lc'}{Lc + Lc'}.$$

This last embodiment of the invention advantageously allows compensating not only chromatic dispersion values Dt*Lt comprised in a predetermined interval of values, but also a predetermined ratio Dt/st, as temperatures T and T' vary, in a predetermined manner, in the intervals of temperatures Tx-Ty and Tx'-Ty'.

In other words, this last embodiment allows compensating both the chromatic dispersion slope and the chromatic dispersion coefficient of optical transmission fibres having the same values of chromatic dispersion slope st and of chromatic dispersion coefficient Dt but different lengths Lt (that is, having equal values of the Dt/st ratio but different chromatic dispersion values Dt*Lt).

For compensating also values of the Dt/st ratio comprised in a preselected interval of values, at the preselected wavelength λ and as temperatures T, T' vary, besides chromatic dispersion values Dt*Lt comprised in a predetermined interval of values, the hole diameter and pitch of the first and second holey fibre, the lengths Lc and Lc' and the intervals of temperature Tx-Ty and Tx'-Ty' are also advantageously selected so that, at the preselected wavelength λ, the first and the second holey optical fibre have such values of the chromatic dispersion slope sc(T) and, respectively, sc(T') and values of the chromatic dispersion coefficient Dc(T) and, respectively, Dc(T') in function of temperatures T and T' that, as temperatures T, T' vary in a predetermined manner between value Tx and value Ty and, respectively, between value Tx' and value Ty', also the following relation (J) is substantially satisfied $$\frac{Dt}{st} = \frac{\frac{Dc(T)}{sc(T)}*Lc + \frac{Dc(T')}{sc(T')}*Lc'}{Lc + Lc'}$$

for all values of the Dt/st ratio comprised in said preselected interval of values.

This last embodiment of the invention advantageously allows compensating not only chromatic dispersion values Dt*Lt comprised in a predetermined interval of values, but values of the Dt/st ratio comprised in a preselected interval of values, as temperatures T and T' vary, in a predetermined manner, in the intervals of temperatures Tx-Ty and Tx'-Ty'.

In other words, this last embodiment allows compensating both the chromatic dispersion slope and the chromatic dispersion coefficient of an optical transmission fibre having a fixed length Lt but variable values of chromatic dispersion slope st and of chromatic dispersion coefficient Dt with respect to the nominal value (due, for example, to variations of system parameters, such as temperature).

Typically, the cladding region of the second holey optical fibre defines a first ring of holes around the core region. Moreover, the holes of said first ring have a mean diameter d' and are spaced from one another by a mean pitch Λ'.

Moreover, the d/Λ ratio of the first holey optical fibre and the d'/Λ' ratio of the second holey optical fibre are advantageously different from each another.

In this way, the chromatic dispersion coefficients Dc(T) and Dc(T') of the two portions of holey optical fibre vary in a different way as the temperature varies.

Advantageously, ratio d/Λ of the first holey optical fibre is of at least 0.7. Preferably, it is of at least 0.8. More preferably, it is of at least 0.9.

Advantageously, ratio d/Λ' of the second holey optical fibre is comprised between 0.4 and 0.7. Preferably, it is comprised between 0.4 and 0.6.

Moreover, in the unit with two portions of optical fibre, the temperature adjusting device can consist of two temperature adjusting apparatuses, one for bringing and maintaining the first holey optical fibre at temperature values selectable in the first predetermined interval of temperatures Tx-Ty and the other for bringing and maintaining the second holey optical fibre at temperature values selectable in the second predetermined interval of temperatures Tx'-Ty'.

In a second aspect thereof, the present invention further relates to an optical communication line comprising a portion of optical transmission fibre having a length Lt and a chromatic dispersion coefficient Dt at a wavelength λ; and a unit comprising, in turn, a portion of holey optical fibre having a predetermined length Lc and comprising a core region and a cladding region, said cladding region comprising, in turn, a plurality of holes passing through it longitudinally, said holes having a respective diameter and being spaced, two by two, according to a respective pitch, characterised in that said unit also comprises a temperature adjusting device for bringing and maintaining the holey optical fibre at a temperature value Tz selectable in a predetermined interval of temperatures Tx-Ty; and in that the hole diameter and pitch, the length Lc, the temperature value Tz and the interval of temperatures Tx-Ty are selected so that the holey optical fibre has such value of the chromatic dispersion coefficient Dc(Tz) at the preselected wavelength λ and at the temperature value Tz, as to compensate the chromatic dispersion of the optical transmission fibre portion.

Typically, the hole diameter and pitch, the length Lc, the temperature value Tz and the interval of temperatures Tx-Ty are selected so that the chromatic dispersion coefficient Dc(Tz) has such value as to substantially satisfy the following relation Dt*Lt=−Dc(Tz)*Lc.

Typically, in said optical communication line the portion of optical transmission fibre also has a chromatic dispersion slope st at wavelength λ, and in the unit, the hole diameter and pitch, the length Lc, the temperature value Tz and the interval of temperature Tx-Ty are also selected so that the holey optical fibre has such value of the chromatic dispersion slope sc(Tz) and a value of the chromatic dispersion coefficient Dc(Tz) at the preselected wavelength λ and at the temperature value Tz, that also the following relation Dt/st=Dc(Tz)/sc(Tz) is substantially satisfied, so as to substantially compensate also the chromatic dispersion slope of the optical transmission fibre portion.

In the event that the portion of optical transmission fibre has a variable chromatic dispersion Dt*Lt in a predetermined interval of values, the hole diameter and pitch, the length Lc and the interval of temperatures Tx-Ty are also advantageously selected so that at the preselected wavelength λ, the holey optical fibre has such values of the chromatic dispersion coefficient Dc(T) in function of temperature that, as temperature T varies between value Tx and value Ty, the following relation Dt*Lt=−Dc(T)*Lc is substantially satisfied for all chromatic dispersion values Dt*Lt comprised in said predetermined interval of values.

Preferably, the unit also comprises a second portion of holey optical fibre having a predetermined length Lc' comprising a core region and a cladding region, said cladding region comprising, in turn, a plurality of holes passing through it longitudinally, said holes having a respective diameter and being spaced, two by two, according to a respective pitch.

In this case, the temperature adjusting device is also advantageously suitable for bringing and maintaining the second holey optical fibre at a temperature value Tz' selectable in a second, predetermined interval of temperatures Tx'-Ty'.

For compensating the chromatic dispersion Dt*Lt of the optical transmission fibre portion, the hole diameter and pitch of the first and second holey fibre, the lengths Lc and Lc', the values of temperature Tz and Tz' and the intervals of temperature Tx-Ty and Tx'-Ty' are advantageously selected so that at the preselected wavelength λ, the first and the second holey optical fibre have such values of the chromatic dispersion coefficient Dc(Tz) and, respectively, Dc(Tz') that the following relation is substantially satisfied $$Dt*Lt=-[Dc(Tz)*Lc+Dc(Tz')*Lc'].$$

For compensating also the chromatic dispersion slope st of the optical transmission fibre portion, the hole diameter and pitch of the first and second holey fibre, the lengths Lc and Lc', the values of temperature Tz and Tz' and the intervals of temperature Tx-Ty and Tx'-Ty' are also advantageously selected so that at the preselected wavelength λ, the first and the second holey optical fibre have such values of the chromatic dispersion slope sc(Tz) and, respectively, sc(Tz'), and values of the chromatic dispersion coefficient Dc(Tz) and, respectively, Dc(Tz'), that also the following relation is substantially satisfied.

$$\frac{Dt}{st} = \frac{\frac{Dc(Tz)}{sc(Tz)}*Lc + \frac{Dc(Tz')}{sc(Tz')}*Lc'}{Lc+Lc'}.$$

In the event that the optical transmission fibre portion has a variable chromatic dispersion Dt*Lt in a predetermined interval of values, the hole diameter and pitch of the first and second holey fibre, the lengths Lc and Lc', and the intervals of temperature Tx-Ty and Tx'-Ty' are advantageously selected so that at the preselected wavelength λ, the first and the second holey optical fibre have such values of the chromatic dispersion coefficient Dc(T) and, respectively, Dc(T'), as temperatures T, T' vary, in a predetermined manner, between values Tx and Ty, and respectively, Tx' and Ty', that the following relation (K) is substantially satisfied $$Dt*Lt=-[Dc(T)*Lc+Dc(T')*Lc']$$

for all values of chromatic dispersion Dt*Lt comprised in the predetermined interval of values.

Moreover, if the optical transmission fibre portion also has a variable Dt/st ratio in a preselected interval of values, the hole diameter and pitch of the first and second holey fibre, the lengths Lc and Lc' and the intervals of temperature Tx-Ty and Tx'-Ty' are also selected so that, at the preselected wavelength λ, the first and the second holey optical fibres have such values of the chromatic dispersion slope sc(T) and, respectively, sc(T') and values of the chromatic dispersion coefficient Dc(T) and, respectively, Dc(T') that, as temperatures T, T' vary in said predetermined manner between value Tx and value Ty and, respectively, between value Tx' and value Ty', also the following relation (J) is substantially satisfied $$\frac{Dt}{st} = \frac{\frac{Dc(T)}{sc(T)}*Lc + \frac{Dc(T')}{sc(T')}*Lc'}{Lc+Lc'}$$

for all values of the Dt/st ratio comprised in said preselected interval of values.

In general, as regards the features of the unit, of the first and second holey optical fibre portion, of the holes of cladding regions, and of the temperature adjusting device, reference shall be made to what already described with reference to the unit according to the first aspect of the invention.

The portion of holey optical fibre can be arranged inside, upstream or downstream of said optical transmission fibre portion. Advantageously, it is arranged downstream of said optical transmission fibre portion. This allows limiting the non-linear effects of the holey optical fibre since, in this case, an optical signal in input to such fibre has a relatively low optical power due to the attenuation undergone along the upstream optical transmission fibre portion.

Typically, said optical communication line also comprises an optical amplifier.

Preferably, said optical amplifier is arranged downstream of said holey optical fibre portion. This allows amplifying the optical signal after passing along the holey optical fibre, so that, when in input to the holey optical fibre, it has a relatively low optical power due to the attenuation undergone along the optical transmission fibre portion. In this way, non-linear effects on the signal by the holey optical fibre are limited.

Advantageously, said amplifier is of the active optical fibre type, doped with a rare earth.

Typically, said rare earth is erbium.

Typically, said portion of optical transmission line is a conventional optical fibre essentially consisting of a core and a cladding having a lower refractive index than that of the core, so as to confine the transmitted signal into the latter.

Typically, both the core and the cladding are made of a silica-based vitreous material, and the difference of refractive index between core and cladding is obtained by incorporating suitable dopants (such as, for example, germanium, phosphorus and/or fluorine) in the vitreous matrix of the core and/or cladding.

Typically, said optical transmission fibre portion is a conventional single mode optical fibre (or SMF) produced, for example, by FOS or by CORNING Inc..

Advantageously, said optical transmission fibre portion is selected from the group comprising a True Wave™ (TW) optical fibre, a True Wave Plus™ (TW+) optical fibre, a True Wave RS™ (TW RS) optical fibre produced by LUCENT Technology Inc.; a large effective area optical fibre (or LEAF), a LEAF Enhanced optical fibre produced by CORNING Inc., and a FreeLight™ optical fibre produced by FOS.

In a third aspect thereof, the present invention further relates to an optical communication system comprising
- a transmitting suitable for providing an optical signal having a signal wavelength λ;
- an optical communication line, optically connected to said transmitting station, for transmitting said optical signal, said line comprising at least one portion of optical transmission fibre, having a length Lt and a chromatic dispersion coefficient Dt at wavelength λ, and a unit comprising, in turn, a portion of holey optical fibre having a predetermined length Lc and comprising a core region and a cladding region, said cladding region comprising, in turn, a plurality of holes passing through it longitudinally, said holes having a respective diameter and being spaced, two by two, according to a respective pitch,
- a receiving station, optically connected to said optical communication line, for receiving said optical signal,
characterised in that
  said unit also comprises a temperature adjusting device for bringing and maintaining the holey optical fibre at a temperature value Tz selectable in a predetermined interval of temperatures Tx-Ty; and in that
  the hole diameter and pitch, the length Lc, the temperature value Tz and the interval of temperatures Tx-Ty are selected so that the holey optical fibre has such value of the chromatic dispersion coefficient Dc(Tz) at the preselected wavelength λ and at the temperature value Tz, as to compensate the chromatic dispersion of the optical transmission fibre portion.

In general, as regards the features of the optical communication line and of the unit, reference shall be made to what already described with reference to the first and second aspect of the invention.

Typically, said optical signal is a WDM optical signal comprising a plurality of N signals having wavelengths λ1, λ2 . . . λN.

In a further aspect thereof, the present invention also relates to a use, for compensating the chromatic dispersion in a reconfigurable manner, of a unit comprising a portion of holey optical fibre having a length Lc comprising a core region and a cladding region, said cladding region comprising, in turn, a plurality of holes passing through it longitudinally, said holes having a respective diameter and being spaced, two by two, according to a respective pitch, said unit being characterised in that it also comprises a temperature adjusting device for bringing and maintaining the holey optical fibre at temperature values T selectable in a predetermined interval of temperatures Tx-Ty so that the holey optical fibre takes desired chromatic dispersion values Dc(T).

As regards the features of the unit, reference shall be made to what described above with reference to the first aspect of the invention.

In a further aspect thereof, the present invention also relates to a method for compensating chromatic dispersion in a reconfigurable manner, comprising the steps of
a) providing a holey optical fibre having a length Lc and comprising a core region and a cladding region, said cladding region comprising, in turn, a plurality of holes passing through it longitudinally, said holes having a respective diameter and being spaced, two by two, according to a respective pitch;
b) bringing and maintaining said holey optical fibre at a temperature T selectable in a predetermined interval of temperatures Tx-Ty so that the holey optical fibre has a desired chromatic dispersion value Dc(T).

Advantageously, for compensating chromatic dispersion values Dt*Lt comprised in a predetermined interval of values, in a reconfigurable manner at a preselected wavelength λ, the method also comprises the step c) of selecting the hole diameter and pitch, the length Lc and the interval of temperature Tx-Ty so that at the preselected wavelength λ, the holey optical fibre has such values of the chromatic dispersion coefficient Dc(T) in function of temperature that, as temperature T varies between value Tx and value Ty, the following relation Dt*Lt=−Dc(T)*Lc is substantially satisfied for all chromatic dispersion values Dt*Lt comprised in said predetermined interval of values.

To compensate both a predetermined value of chromatic dispersion slope st and a predetermined value of chromatic dispersion Dt, at a preselected wavelength λ and at a preselected temperature Tz comprised in the interval Tx-Ty, the method of the invention also comprises the step d) of selecting the hole diameter and pitch, the length Lc and the interval of temperature Tx-Ty so that at the preselected wavelength λ, the holey optical fibre has such value of the chromatic dispersion slope sc and such value of the chromatic dispersion coefficient Dc in function of the temperature, as to substantially satisfy the following relation Dt/st=Dc(Tz)/sc(Tz).

In a preferred embodiment, the method of the invention also comprises the step e) of providing also a second portion of holey optical fibre having a predetermined length Lc' comprising a core region and a cladding region, said cladding region comprising, in turn, a plurality of holes passing through it longitudinally, said holes having a respective diameter and being spaced, two by two, according to a respective pitch.

In this case, the method of the invention also comprises the step f) of bringing and maintaining the second holey optical fibre at a temperature value T' selectable in a second, predetermined interval of temperatures Tx'-Ty'.

For compensating chromatic dispersion values Dt*Lt comprised in a predetermined interval of values, at the preselected wavelength λ, in place of step c) the method of the invention comprises the step g) of selecting the diameter and pitch of the holes of the first and second holey fibre, the lengths Lc and Lc', and the intervals of temperature Tx-Ty and Tx'-Ty' so that at the preselected wavelength λ, the first and the second holey optical fibre have such values of the chromatic dispersion coefficient Dc(T) and, respectively, Dc(T'), in function of temperature that, as temperatures T, T' vary, in a predetermined manner, between value Tx and value Ty, and respectively, between value Tx' and Ty', the following relation (K) is substantially satisfied $$Dt*Lt=-[Dc(T)*Lc+Dc(T')*Lc'],$$

for all values of chromatic dispersion Dt*Lt comprised in said predetermined interval of values.

To compensate also a predetermined ratio Dt/st at the preselected wavelength λ and as temperatures T, T' vary, in place of step d) the method of the invention also comprises the step h) of selecting the hole diameter and pitch of the first and second holey fibre, the lengths Lc and Lc' and the intervals of temperature Tx-Ty and Tx'-Ty' so that, at the preselected wavelength λ, the first and the second holey optical fibres have such values of the chromatic dispersion slope sc(T) and, respectively, sc(T') and values of the chromatic dispersion coefficient Dc(T) and, respectively, Dc(T') in function of temperatures T and T' that, as temperatures T, T' vary in said predetermined manner between value Tx and value Ty and, respectively, between value Tx' and value Ty', also the following relation (J) is substantially satisfied.

$$\frac{Dt}{st} = \frac{\frac{Dc(T)}{sc(T)}*Lc + \frac{Dc(T')}{sc(T')}*Lc'}{Lc+Lc'}.$$

BRIEF DESCRIPTION OF THE DRAWINGS

Further features and advantages of the present invention will appear more clearly from the following detailed description of a preferred embodiment, made with reference to the attached drawings. In such drawings.

DETAILED DESCRIPTION OF THE INVENTION

Figure 2:
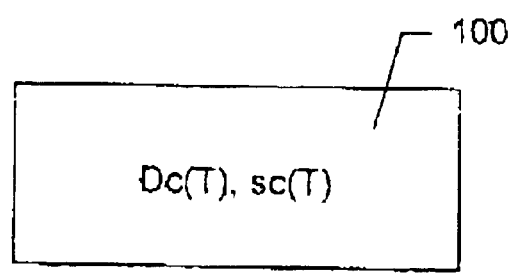
FIG. 2 shows a schematic representation of a unit according to the invention.

FIG. 2 shows a schematic representation of a unit 100 according to the invention.

Figure 3A:
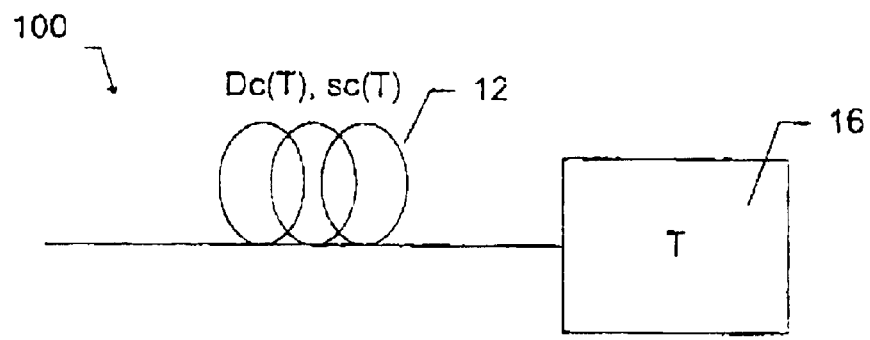
FIG. 3 shows a schematic representation of a first embodiment of a unit according to the invention (FIG. 3a), of the unit according to the first embodiment wherein the holey optical fibre is inserted into a temperature adjusting device (FIG. 3b) and of the unit according to the first embodiment wherein the holey optical fibre is arranged on the temperature adjusting device (FIG. 3c)

According to a first embodiment, shown in FIG. 3a, unit 100 comprises a holey optical fibre portion 12 and a temperature adjusting device 16.

Figure 1:
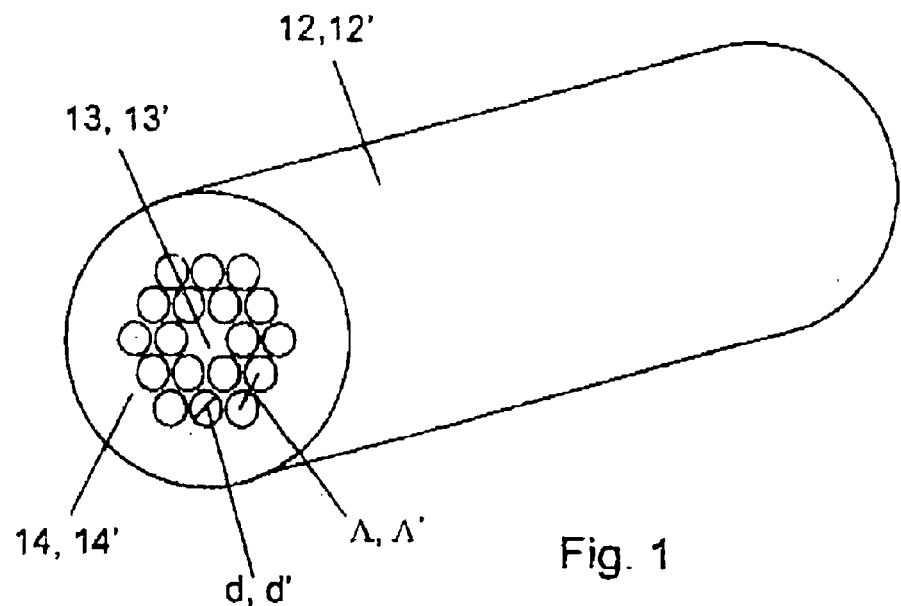
FIG. 1 shows a schematic representation of a holey optical fibre suitable for being used in a unit according to the invention.

The portion of holey optical fibre 12 has a length Lc, a solid core region 13 and a cladding region 14 surrounding the core region 13 (FIG. 1).

In the embodiment shown in FIG. 1, the cladding region 14 comprises two rings of holes surrounding the core region 13 and passing through the holey optical fibre portion 12 longitudinally for its entire length.

The two rings of holes have hexagonal shape. Moreover, the holes of the two rings have a substantially equal diameter d, and are spaced from one another according to a pitch Λ.

Moreover, both the core region 13 and the cladding region 14 consist of silica-based vitreous material, and the holes are filled with air.

The holey optical fibre portion 12 can be produced according to a known method, such as for example, that described in patent U.S. Pat. No. 5,802,236.

The temperature adjusting device 16 is suitable for bringing and maintaining the holey optical fibre 16 at temperature values T selectable in an interval of temperatures Tx-Ty.

For example, such device 16 is a conventional small furnace suitable to receive inside the holey optical fibre 12. For example, such small furnace is a device produced and marketed by MAZZALY SYSTEMS S.p.A.

Figure 3B:
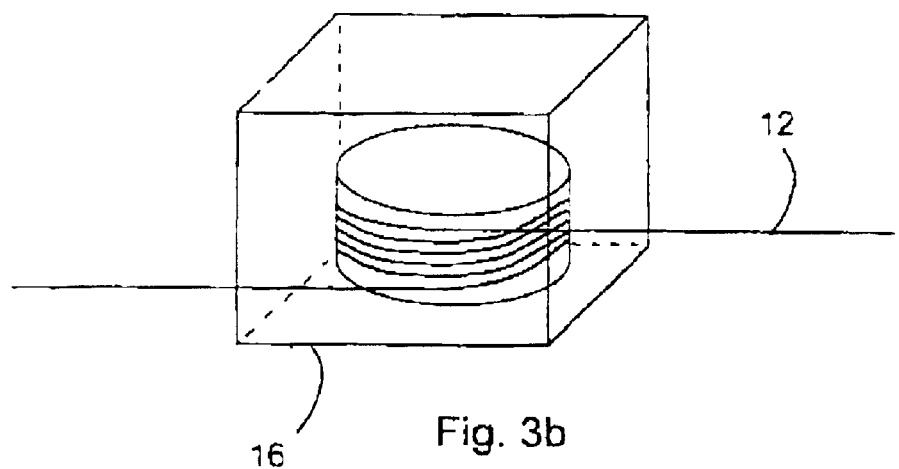
Figure 3C:
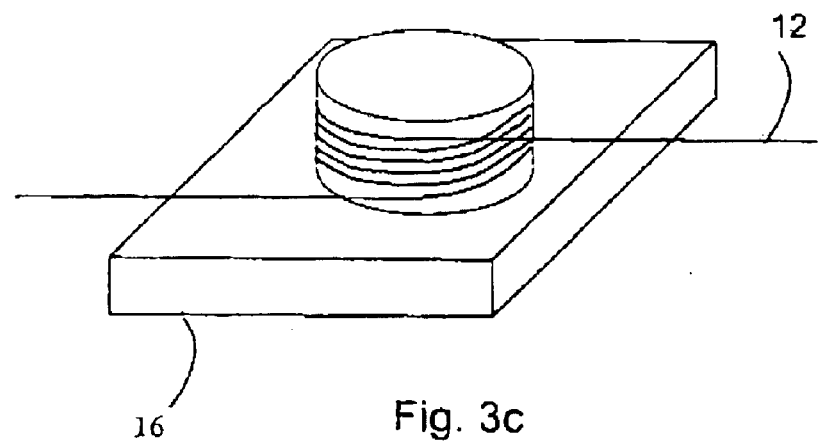

For example, in the embodiment of FIG. 3b, the holey optical fibre 12 is wound on itself around a coil, and it is arranged inside the temperature adjusting device 16 whereas, in the embodiment of FIG. 3c, the holey optical fibre 12, wound on itself around the coil, is arranged on the temperature adjusting device 16.

Length Lc and diameter d and pitch Λ of the holes of the holey optical fibre 12 and the interval of temperatures Tx-Ty, can be selected so that at a preselected wavelength λ, the holey optical fibre 12 has such values of the chromatic dispersion coefficient Dc(T) in function of temperature that, as temperature T varies between value Tx and value Ty, the following relation Dt*Lt=−Dc(T)*Lc is substantially satisfied for all chromatic dispersion values Dt*Lt comprised in a predetermined interval of values.

This allows compensating, in a reconfigurable manner, different values of chromatic dispersion Dt*Lt comprised in a predetermined interval of values, at the preselected wavelength λ.

In the following examples, the values of chromatic dispersion coefficients Dt, Dc and of the chromatic dispersion slope st, sc have been determined at wavelength λ of about 1550 nm.

EXAMPLE 1

The Applicant has considered the case of compensating, in a reconfigurable manner, the chromatic dispersion of optical transmission fibre portions having lengths Lt comprised between about 70 and 110 Km and predetermined values of the chromatic dispersion coefficient Dt.

For example, in the case of TW+, FreeLight, Leaf Enhanced, Leaf and TW fibres, the chromatic dispersion coefficient Dt has the values shown in table 1.

TABLE 1

| Type of fibre | Dt (ps/(nm*Km) |
|---|---|
| TW+ | 4.0 |
| FreeLight | 4.2 |
| Leaf Enhanced | 4.3 |

TABLE 1-continued

| Type of fibre | Dt (ps/(nm*Km) |
|---|---|
| Leaf | 3.7 |
| TW | 2.4 |

70–110 Km portions of said fibres are thus characterised by the chromatic dispersion values Dt*Lt shown in table 2.

TABLE 2

| Dt*Lt (ps/nm) | 70 km | 80 km | 90 km | 100 km | 110 km |
|---|---|---|---|---|---|
| TW+ | 280 | 320 | 360 | 400 | 440 |
| FreeLight | 294 | 336 | 378 | 420 | 462 |
| Leaf Enhanced | 301 | 344 | 387 | 430 | 473 |
| Leaf | 259 | 296 | 333 | 370 | 407 |
| TW | 168 | 192 | 216 | 240 | 264 |

In this case, length Lc and diameter d and pitch Λ of the holes of the holey optical fibre 12 and the interval of temperature Tx-Ty, must thus be selected so that at a preselected wavelength λ, the holey optical fibre 12 has such values of the chromatic dispersion coefficient Dc(T) in function of temperature that, as temperature T varies between value Tx and value Ty, the following relation Dt*Lt=−Dc(T)*Lc is substantially satisfied for all chromatic dispersion values Dt*Lt comprised between 168 and 473 (ps/nm).

Solving the Maxwell vectorial equations of light propagation in a holey optical fibre—as described, for example, by Ferrando et al. ("*Full-vector analysis of realistic photonic crystal fiber*", Optics Letters, Vol. 24, No. 5, March 1999, pages 276–278) and by Silvestre et al. ("*Biorthormal-basis method for the vector description of optical fiber modes*", Journal of Lightwave Technology, Vol. 16, No. 5, May, 1998, pages 923–928)—the Applicant has determined the values of the chromatic dispersion coefficient Dc(T) as temperature T varies in an interval Tx-Ty comprised between −20 and 60° C. of a holey optical fibre 12 having a ratio d/Λ equal to about 0.9 and a pitch Λ equal to about 1.165 μm. The determined values are shown in Table 3.

TABLE 3

| T ° C. | Dc(T) (ps/(nm*Km)) |
|---|---|
| −20 | −20.1 |
| 20 | −15.9 |
| 60 | −11.8 |

With two units 100 having two respective holey optical fibres 12 with the above values of d and d/Λ and length Lc respectively of about 14.2 Km and 24.2 Km, it is thus possible to compensate chromatic dispersion values Dt*Lt comprised between 168 and 286 (ps/nm) and, respectively, 286 and 473 (ps/nm), as shown in Table 4.

TABLE 4

| Dc*Lc (ps/nm) | T = −20° C. | T = 20° C. | T = 60° C. |
|---|---|---|---|
| Lc = 14.2 km | −286 | −225.7 | −168 |
| Lc = 24.2 km | −487 | −384.7 | −286 |

In brief, with a unit 100 having a holey optical fibre with a ratio d/Λ equal to about 0.9, a pitch Λ equal to about 1.165 μm and a length Lc of about 14.2 Km, it is possible to compensate chromatic dispersion values Dt*Lt comprised between 168 and 286 (ps/nm) as temperature T varies from −20 to 60° C.

In turn, with a unit 100 having a holey optical fibre with a ratio d/Λ equal to about 0.9, a pitch Λ equal to about 1.165 μm and a length Lc of about 24.2 Km, it is possible to compensate chromatic dispersion values Dt*Lt comprised between 286 and 487 (ps/nm) as temperature T varies from −20 to 60° C.

With just two units 100 it is thus possible to compensate, in a reconfigurable manner, the chromatic dispersion Dt*Lt of optical transmission fibre portions of the TW+, FreeLight, Leaf Enhanced, Leaf and TW type having typical lengths of optical communication systems (comprised between 70 and 110 Km), by regulating the temperature of temperature adjusting devices 16 between −20° C. and 60° C.

EXAMPLE 2

The Applicant has also considered the case of compensating, in a reconfigurable manner, the chromatic dispersion of SMF optical transmission fibre portions having lengths Lt comprised between about 70 and 110 Km and a chromatic dispersion coefficient value Dt equal to about 17 ps/(nm*km).

Such 70–110 Km portions of SMF fibre are characterised by the chromatic dispersion values Dt*Lt shown in table 5.

TABLE 5

| SMF | 70 km | 80 km | 90 km | 100 km | 110 km |
|---|---|---|---|---|---|
| Dt*Lt (ps/nm) | 1190 | 1360 | 1530 | 1700 | 1870 |

The chromatic dispersion coefficient values Dc(T) as temperature T of a holey optical fibre 12 having, for example, a ratio d/Λ equal to about 0.9 and a pitch Λ equal to about 1.145 μm varies, are shown in Table 6.

TABLE 6

| T ° C. | Dc(T) (ps/(nm*Km)) |
|---|---|
| −20 | −41.89 |
| 20 | −37.43 |
| 60 | −32.97 |

With two units 100 having two respective holey optical fibres 12 with the above features and length Lc respectively of about 36.1 Km and 45.85 Km, it is thus possible to compensate chromatic dispersion values Dt*Lt comprised between 1190 and 1512 (ps/nm) and, respectively, 1512 and 1920 (ps/nm), as shown in Table 7.

TABLE 7

| Dc*Lc (ps/nm) | T = −20° C. | T = 20° C. | T = 60° C. |
|---|---|---|---|
| Lc = 36.1 km | −1512 | −1366 | −1190 |
| Lc = 45.85 km | −1920 | −1716 | −1512 |

With just two units 100 it is thus possible to compensate the chromatic dispersion Dt*Lt of optical transmission fibre portions of the SMF type having lengths comprised between about 70 and 113 Km, by regulating the temperature of temperature adjusting devices 16 in an interval Tx-Ty comprised between −20 and 60° C.

EXAMPLE 3

Finally, the Applicant has considered the case of compensating, in a reconfigurable manner, the chromatic dispersion of TW RS optical transmission fibre portions having lengths Lt comprised between about 70 and 110 Km and a chromatic dispersion coefficient value Dt equal to about 5.7 ps/(nm*km).

Such 70–110 Km portions of TW RS fibre are characterised by the chromatic dispersion values Dt*Lt shown in table 8.

TABLE 8

| TW RS | 70 km | 80 km | 90 km | 100 km | 110 km |
|---|---|---|---|---|---|
| Dt*Lt (ps/nm) | 399 | 456 | 513 | 570 | 627 |

The chromatic dispersion coefficient values Dc(T) as temperature T of a holey optical fibre 12 having a ratio d/Λ equal to about 0.9 and a pitch Λ equal to about 1.145 μm varies, are shown in Table 9.

TABLE 9

| T ° C. | Dc(T) (ps/(nm*Km)) |
|---|---|
| −20 | −41.89 |
| 20 | −37.43 |
| 60 | −32.97 |

With two units 100 having two respective holey optical fibres 12 with the above features and length Lc respectively of about 12.1 Km and 15.37 Km, it is thus possible to compensate chromatic dispersion values Dt*Lt comprised between 399 and 507 (ps/nm) and, respectively, 507 and 644 (ps/nm), as shown in Table 10.

TABLE 10

| Dc*Lc (ps/nm) | T = −20° C. | T = 20° C. | T = 60° C. |
|---|---|---|---|
| Lc = 12.1 km | −507 | −458 | −399 |
| Lc = 15.37 km | −644 | −575 | −507 |

With just two units 100 it is thus possible to compensate the chromatic dispersion Dt*Lt of optical transmission fibre portions of the TW RS type having lengths comprised between 70 and 113 Km, by regulating the temperature of temperature adjusting devices 16 in an interval Tx-Ty comprised between −20 and 60° C.

Length Lc, diameter d and pitch Λ of the holes of the holey optical fibre 12 and the interval of temperature Tx-Ty, can also be selected so that at a preselected wavelength λ, the holey optical fibre 12 has such values of the chromatic dispersion coefficient Dc(T) and of the chromatic dispersion slope sc(T) in function of temperature that, as temperature T varies between value Tx and value Ty, the following relation Dt*Lt=−Dc(T)*Lc is substantially satisfied for all chromatic dispersion values Dt*Lt comprised in a predetermined interval of values; and for a temperature value Tz selected in the interval of values comprised between Tx and Ty, also the following relation Dt/st=Dc(Tz)/sc(Tz) is substantially satisfied.

This allows compensating, at the preselected wavelength λ, both values of chromatic dispersion Dt*Lt comprised in a predetermined interval of values, as temperature varies between Tx and Ty, and the chromatic dispersion slope st at a temperature Tz.

EXAMPLE 4.1

The Applicant has considered the case of compensating, in a reconfigurable manner, the chromatic dispersion of TW+ optical transmission fibre portions having lengths Lt comprised between about 70 and 110 Km. An optical transmission fibre of the TW+ type has a value of the chromatic dispersion coefficient Dt equal to about 4.0 ps/(nm*Km), a value of the chromatic dispersion slope st equal to about 0.0715 ps/(nm$^2$*Km), and a value of the Dt/st ratio equal to about 55.9 nm$^{-1}$ (for chromatic dispersion values Dt*Lt of a TW+ optical fibre as length Lt varies, reference shall be made to the values shown in Table 2, first line).

The values of Dc(T), sc(T) and Dc(T)/sc(T) as temperature T of a holey optical fibre 12 having a ratio d/Λ equal to about 0.9 and a pitch Λ equal to about 1.140 mm varies, are shown in Table 11.

TABLE 11

| T (° C.) | −20 | 20 | 40 | 60 |
|---|---|---|---|---|
| Dc(T) ps/(nm*km) | −47.68 | −43.13 | −40.86 | −38.59 |
| sc(T) ps/(nm$^2$*km) | −0.805 | −0.796 | −0.79 | −0.785 |
| Dc(T)/sc(T) (nm$^{-1}$) | 59.19 | 54.18 | 51.72 | 49.17 |

The values of Table 11 show that, with two units 100 having two respective holey optical fibres 12 with the above features and length Lc respectively of about 7.23 Km and 9.05 Km, it is possible to compensate chromatic dispersion Dt*Lt of TW+ optical fibre portions having lengths comprised between about 73.9 and 86.3 km and, respectively, 92.4 and 107.8 km, as temperature varies from −20 to 40° C.

Moreover, at temperature Tz of about 10° C., unit 100 having the holey optical fibre 12 with length Lc of about 7.23 Km is capable of compensating, besides the chromatic dispersion coefficient Dt, also the chromatic dispersion slope st of a TW+ optical fibre portion of 80 Km, (that is, at temperature Tz of 10° C. the ratio Dc(Tz)/sc(Tz) is almost equal to ratio Dt/st).

In turn, at temperature Tz of about 10° C., unit 100 having the holey optical fibre 12 with length Lc of about 9.05 Km is capable of compensating, besides the chromatic dispersion coefficient Dt, also the chromatic dispersion slope st of a TW+ optical fibre portion of 100 Km.

At other temperatures T comprised between −20 and 40° C. different from 10° C. (that is, for the other TW+ optical transmission fibre portions having lengths Lt different from 80 or 100 Km), the chromatic dispersion slope st is not totally compensated. More in particular, at such temperatures there is a residual chromatic dispersion slope (after the passage of an optical signal through a TW+ optical transmission fibre portion and a unit 100 of the invention) comprised between −0.0054 and +0.0037 and between −0.0054 and +0.0036 in the case of holey optical fibre 12 with length Lc of 7.23 Km and, respectively, 9.05 Km.

The above results are summarised in Table 12.

TABLE 12

| Lc (Km) | Lt (Km)-TW+ | Tx–Ty | residual_s ps/(nm$^2$*km) |
|---|---|---|---|
| 7.23 | [73.9–86.3] | [−20/40° C.] | [−0.0054/+0.0037] |
| 9.05 | [92.4–107.8] | [−20/40° C.] | [−0.0054/+0.0036] |

Considering, for example, that in the Erbium band (1530–1570 nm), a 40 Gb/s system typically tolerates, in terms of bit error rate, substantially the following absolute values of the residual chromatic dispersion slope (residual_s):

residual_s <0.00125 ps/(nm$^2$*km) for links of 10000 Km
residual_s <0.001563 ps/(nm$^2$*km) for links of 8000 Km
residual_s <0.001953 ps/(nm$^2$*km) for links of 7000 Km
residual_s <0.002343 ps/(nm$^2$*km) for links of 6000 Km
residual_s <0.002734 ps/(nm$^2$*km) for links of 5000 Km
residual_s <0.003125 ps/(nm$^2$*km) for links of 4000 Km
residual_s <0.00468 ps/(nm$^2$*km) for links of 3000 Km
residual_s <0.00625 ps/(nm$^2$*km) for links of 2000 Km the above units 100 can be used in a 40 Gb/s WDM optical transmission system for compensating chromatic dispersion and chromatic dispersion slope of TW+ optical transmission fibre portions in links having lengths up to about 2500 Km.

EXAMPLE 4.2

Moreover, the Applicant has determined the values of Dc(T), sc(T), Dc(T)/sc(T), Lc, Lt, Tx-Ty and residual_s in the case of a TW+ optical transmission fibre and of a holey optical fibre 12 having a ratio d/Λ equal to about 0.5 and a pitch Λ equal to about 1.505 mm. The values thus found are shown in Tables 13 and 14.

TABLE 13

| T (° C.) | −20 | 20 | 80 |
|---|---|---|---|
| Dc(T) ps/(nm*km) | −14.8 | −13.3 | −10.99 |
| sc(T) ps/(nm$^2$*km) | −0.22 | −0.217 | −0.214 |
| Dc(T)/sc(T) (nm-1) | 67.7 | 61.1 | 51.3 |

TABLE 14

| Lc (Km) | Lt (Km)-TW+ | Tx–Ty | residual_s ps/(nm$^2$*km) |
|---|---|---|---|
| 26.4 | [72.5–87.8] | [+20/80° C.] | [−0.0047/+0.0048] |
| 33 | [90.6–109.7] | [+20/80° C.] | [−0.0047/+0.0047] |

Moreover, in this case, the unit 100 having the holey optical fibre 12 with length Lc of about 26.4 Km is capable of compensating, besides the chromatic dispersion coefficient Dt, also the chromatic dispersion slope st of a TW+ optical fibre portion of 80 Km, at the temperature Tz of about 50° C. (that is, at the temperature Tz of 50° C., the ratio Dc(Tz)/sc(Tz) is almost equal to ratio Dt/st).

In turn, the unit 100 having the holey optical fibre 12 with length Lc of about 33 Km is capable of compensating, besides the chromatic dispersion coefficient Dt, also the chromatic dispersion slope st of a TW+ optical fibre portion of 100 Km at the temperature Tz of about 50° C.

Comparing the values of table 12—obtained with a holey optical fibre 12 having a ratio d/Λ equal to about 0.9 and a pitch Λ equal to about 1.140μm—with those of Table 14—obtained with a holey optical fibre 12 having a ratio d/Λ equal to about 0.5 and a pitch Λ equal to about 1.505μm—it can be noted that, decreasing ratio d/Λ:
- the unit is less efficient (greater length Lc of the holey optical fibres 12);
- the amplitude of the interval of lengths Lt that can be compensated is slightly greater;
- the amplitude of the interval Tx-Ty has remained unchanged; and
- the maximum absolute value of the residual_s is slightly lower.

Moreover, the Applicant has found that a lower d/Λ ratio corresponds to a greater effective area of the holey optical fibre 12.

EXAMPLE 5.1

Moreover, the Applicant has considered the case of compensating, in a reconfigurable manner, the chromatic dispersion of TW optical transmission fibre portions having lengths Lt comprised between about 70 and 110 Km. An optical transmission fibre of the TW type has a value of the chromatic dispersion coefficient Dt equal to about 2.4 ps/(nm*Km), a value of the chromatic dispersion slope st equal to about 0.0716 ps/(nm$^2$*Km), and a value of the Dt/st ratio equal to about 33.5 nm$^{-1}$ (for chromatic dispersion values Dt*Lt in the case of a TW optical fibre as length Lt varies, reference shall be made to the values shown in Table 2, last line).

The values of Dc(T), sc(T), Dc(T)/sc(T), Lc, Lt, Tx-Ty and residual_s in the case of a TW optical transmission fibre and of a holey optical fibre 12 having a ratio d/Λ equal to about 0.9 and a pitch Λ equal to about 1.156 mm are shown in Tables 15 and 16.

TABLE 15

| T (° C.) | Dc ps/(nm*km) | sc ps/(nm$^2$*km) | Dc/sc (nm$^{-1}$) |
|---|---|---|---|
| −20 | −29.774 | −0.759 | 39.22 |
| 0 | −27.635 | −0.754 | 36.65 |
| 20 | −25.497 | −0.749 | 33.96 |
| 40 | −23.358 | −0.744 | 31.39 |
| 60 | −21.219 | −0.739 | 28.71 |

TABLE 16

| Lc (Km) | Lt (Km)-TW | Tx–Ty | residual_s ps/(nm$^2$*km) |
|---|---|---|---|
| 7.53 | [73.3–86.7] | [0/40° C.] | [−0.00447/+0.00553] |
| 9.41 | [91.5–108.4] | [0/40° C.] | [−0.00454/+0.00556] |

The values of Table 16 show that, with two units 100 having two respective holey optical fibres 12 with the above features and length Lc respectively of about 7.53 Km and 9.41 Km, it is possible to compensate the chromatic dispersion Dt*Lt of TW optical fibre portions having lengths comprised between about 73.3 and 86.7 and, respectively, 91.5 and 108.4, as temperature varies from 0 a to 40° C.

Moreover, at temperature Tz of about 20° C., unit 100 having the holey optical fibre 12 with length Lc of about 7.53 Km is capable of compensating, besides the chromatic dispersion coefficient Dt, also the chromatic dispersion slope st of a TW optical fibre portion of 80 Km, (that is, at temperature Tz of 20° C. the ratio Dc(Tz)/sc(Tz) is almost equal to ratio Dt/st).

In turn, at temperature Tz of about 20° C., unit 100 having the holey optical fibre 12 with length Lc of about 9.41 Km is capable of compensating, besides the chromatic dispersion coefficient Dt, also the chromatic dispersion slope st of a TW optical fibre portion of 100 Km.

The absolute value of the residual chromatic dispersion slope (residual_s) at the other temperatures comprised between 0 and 40° C. is less than or equal to, about 0.0055 ps/(nm$^2$*Km). That is, the above units 100 can be used in a 40 Gb/s WDM optical transmission system for compensating chromatic dispersion and chromatic dispersion slope of TW optical transmission fibre portions in links having lengths up to about 2500 Km.

EXAMPLE 5.2

Moreover, the Applicant has determined the values of Dc(T), sc(T), Dc(T)/sc(T), Lc, Lt, Tx-Ty and residual_s in the case of a TW optical transmission fibre and of a holey optical fibre 12 having a ratio d/Λ equal to about 0.5 and a pitch Λ equal to about 1.525 mm. The values thus found are shown in Tables 17 and 18.

TABLE 17

| T (° C.) | 10 | 20 | 30 | 50 |
|---|---|---|---|---|
| Dc(T) ps/(nm*km) | −7.786 | −7.415 | −6.96 | −6.33 |
| sc(T) ps/(nm$^2$*km) | −0.209 | −0.208 | −0.2075 | −0.207 |
| Dc(T)/sc(T) (nm$^{-1}$) | 37.34 | 35.5 | 33.5 | 30.51 |

TABLE 18

| Lc (Km) | Lt (Km)-TW | Tx–Ty | residual_s ps/(nm$^2$*km) |
|---|---|---|---|
| 27.25 | [71.5–88.5] | [+10/50° C.] | [−0.00535/+0.00546] |
| 34.06 | [89–110.6] | [+10/50° C.] | [−0.00558/+0.00545] |

In this case, the unit 100 having the holey optical fibre 12 with length Lc of about 27.25 Km is capable of compensating, besides the chromatic dispersion coefficient Dt, also the chromatic dispersion slope st of a TW optical fibre portion of 80 Km, at the temperature Tz of 30° C. (that is, at the temperature Tz of 30° C., the ratio Dc(Tz)/sc(Tz) is almost equal to ratio Dt/st).

In turn, the unit 100 having the holey optical fibre 12 with length Lc of about 34.06 Km is capable of compensating, besides the chromatic dispersion coefficient Dt, also the chromatic dispersion slope st of a TW optical fibre portion of 100 Km at the temperature Tz of 30° C.

Comparing the values of table 16—obtained with a holey optical fibre 12 having a ratio d/Λ equal to about 0.9 and a pitch Λ equal to about 1.156 mm—with those of Table 18—obtained with a holey optical fibre 12 having a ratio d/Λ equal to about 0.5 and a pitch Λ equal to about 1.525 mm—it can be noted that, decreasing ratio d/Λ:

- the unit is less efficient (greater length Lc of the holey optical fibres 12);
- the amplitude of the interval of lengths Lt that can be compensated is slightly greater;
- the amplitude of the interval Tx-Ty has remained unchanged; and
- the maximum absolute value of the residual_s is slightly higher.

Moreover, the Applicant has found that a lower d/Λ ratio corresponds to a greater effective area of the holey optical fibre 12.

EXAMPLE 6.1

Moreover, the Applicant has considered the case of compensating, in a reconfigurable manner, the chromatic dispersion of TW RS optical transmission fibre portions having lengths Lt comprised between about 70 and 110 Km. An optical transmission fibre of the TW RS type has a value of the chromatic dispersion coefficient Dt equal to about 5.7 ps/(nm*Km), a value of the chromatic dispersion slope st equal to about 0.045 ps/(nm$^2$*Km), and a value of the Dt/st ratio equal to about 126.7 nm$^{-1}$ (for chromatic dispersion values Dt*Lt in the case of a TW RS optical fibre as length Lt varies, reference shall be made to the values shown in Table 8).

The values of Dc(T), sc(T), Dc(T)/sc(T), Lc, Lt, Tx-Ty and residual_s in the case of a TW RS optical transmission fibre and of a holey optical fibre 12 having a ratio d/Λ equal to about 0.9 and a pitch Λ equal to about 1.080 mm are shown in Tables 19 and 20.

TABLE 19

| T (° C.) | Dc ps/(nm*km) | sc ps/(nm²*km) | Dc/sc (nm⁻¹) |
|---|---|---|---|
| −20 | −131.46 | −1.002 | 131.13 |
| 20 | −125.76 | −0.9911 | 126.88 |
| 60 | −120.06 | −0.9803 | 122.4 |

TABLE 20

| Lc (Km) | Lt (Km)-TW RS | Tx–Ty | residual_s ps/(nm²*km) |
|---|---|---|---|
| 3.62 | [76.2–86.5] | [−20/60° C.] | [−0.0015/+0.0029] |
| 4.53 | [95.4–104.5] | [−20/60° C.] | [−0.0015/+0.0015] |

The values of Table 20 show that, with two units 100 having two respective holey optical fibres 12 with the above features and length Lc respectively of about 3.62 Km and 4.53 Km, it is possible to compensate the chromatic dispersion Dt*Lt of TW RS optical fibre portions having lengths comprised between about 76.2 and 86.5 and, respectively, 95.4 and 104.5, as temperature varies from −20 to 60° C.

Moreover, at temperature Tz of about 20° C., unit 100 having the holey optical fibre 12 with length Lc of about 3.62 Km is capable of compensating, besides the chromatic dispersion coefficient Dt, also the chromatic dispersion slope st of a TW RS optical fibre portion of 80 Km, (that is, at temperature Tz of 20° C. the ratio Dc(Tz)/sc(Tz) is almost equal to ratio Dt/st).

In turn, at temperature Tz of about 20° C., unit 100 having the holey optical fibre 12 with length Lc of about 4.53 Km is capable of compensating, besides the chromatic dispersion coefficient Dt, also the chromatic dispersion slope st of a TW RS optical fibre portion of 100 Km.

The absolute value of the residual chromatic dispersion slope (residual_s) at the other temperatures comprised between −20 and 60° C. is less than or equal to, about 0.0029 ps/(nm²*Km). That is, the above units 100 can be used in a 40 Gb/s WDM optical transmission system for compensating chromatic dispersion and chromatic dispersion slope of TW RS optical transmission fibre portions in links having length up to about 4500 Km.

EXAMPLE 6.2

Moreover, the Applicant has determined the values of Dc(T), sc(T), Dc(T)/sc(T), Lc, Lt, Tx-Ty and residual_s in the case of a TW RS optical transmission fibre and of a holey optical fibre 12 having a ratio d/Λ equal to about 0.5 and a pitch Λ equal to about 1.450 mm. The values thus found are shown in Tables 21 and 22.

TABLE 21

| T (° C.) | −20 | 20 | 60 |
|---|---|---|---|
| Dc(T) ps/(nm*km) | −31.798 | −30.113 | −28.428 |
| sc(T) ps/(nm²*km) | −0.2400 | −0.2385 | −0.2371 |
| Dc(T)/sc(T) (nm-1) | 132.46 | 126.22 | 119.8 |

TABLE 22

| Lc (Km) | Lt (Km)-TW RS | Tx–Ty | residual_s ps/(nm²*km) |
|---|---|---|---|
| 15.14 | [75.5–84.4] | [−20/60° C.] | [−0.0021/+0.00168] |
| 18.93 | [94.4–105.6] | [−20/60° C.] | [−0.0021/+0.00167] |

Moreover, in this case, the unit 100 having the holey optical fibre 12 with length Lc of about 15.14 Km is capable of compensating, besides the chromatic dispersion coefficient Dt, also the chromatic dispersion slope st of a TW RS optical fibre portion of 80 Km, at the temperature Tz of 20° C. (that is, at the temperature Tz of about 20° C., the ratio Dc(Tz)/sc(Tz) is almost equal to ratio Dt/st).

In turn, the unit 100 having the holey optical fibre 12 with length Lc of about 18.93 Km is capable of compensating, besides the chromatic dispersion coefficient Dt, also the chromatic dispersion slope st of a TW RS optical fibre portion of 100 Km at the temperature Tz of about 20° C.

Comparing the values of table 20—obtained with a holey optical fibre 12 having a ratio d/Λ equal to about 0.9 and a pitch Λ equal to about 1.080 mm—with those of Table 22—obtained with a holey optical fibre 12 having a ratio d/Λ equal to about 0.5 and a pitch Λ equal to about 1.450 mm—it can be noted that, decreasing ratio d/Λ:

the unit is less efficient (greater length Lc of the holey optical fibres 12);

the amplitude of the interval of lengths Lt that can be compensated is slightly greater;

the amplitude of the interval Tx-Ty has remained unchanged; and the maximum absolute value of the residual_s is lower.

Moreover, the Applicant has found that a lower d/Λ ratio corresponds to a greater effective area of the holey optical fibre 12.

EXAMPLE 7.1

Moreover, the Applicant has considered the case of compensating, in a reconfigurable manner, the chromatic dispersion of SMF optical transmission fibre portions having lengths Lt comprised between about 70 and 110 Km. An optical transmission fibre of the SMF type has a value of the chromatic dispersion coefficient Dt equal to about 17 ps/(nm*Km), a value of the chromatic dispersion slope st equal to about 0.068 ps/(nm²*Km), and a value of the Dt/st ratio equal to about 251 nm⁻¹ (for chromatic dispersion values Dt*Lt in the case of a SMF optical fibre as length Lt varies, reference shall be made to the values shown in Table 5).

The values of Dc(T), sc(T), Dc(T)/sc(T), Lc, Lt, Tx-Ty and residual_s in the case of a SMF optical transmission fibre and of a holey optical fibre 12 having a ratio d/Λ equal to about 0.9 and a pitch Λ equal to about 0.970 mm are shown in Tables 23 and 24.

TABLE 23

| T (° C.) | Dc ps/(nm*km) | sc ps/(nm²*km) | Dc/sc (nm⁻¹) |
|---|---|---|---|
| −20 | −355.15 | −1.3834 | 256.72 |
| 20 | −347.11 | −1.3749 | 252.46 |
| 60 | −339.07 | −1.3665 | 248.13 |

TABLE 24

| Lc (Km) | Lt (Km)-SMF | Tx–Ty | residual_s ps/(nm²*km) |
|---|---|---|---|
| 3.92 | [78.1–81.8] | [−20/60° C.] | [−0.00078/+0.00141] |
| 4.89 | [97.7–102.3] | [−20/60° C.] | [−0.000775/+0.00141] |

The values of Table 24 show that, with two units 100 having two respective holey optical fibres 12 with the above features and length Lc respectively of about 3.92 Km and 4.89 Km, it is possible to compensate the chromatic dispersion Dt*Lt of SMF optical fibre portions having lengths comprised between about 78,1 and 81,8 and, respectively, 97.7 and 102.3, as temperature varies from −20 a to 60° C.

Moreover, at temperature Tz of about 20° C., unit 100 having the holey optical fibre 12 with length Lc of about 3.92 Km is capable of compensating, besides the chromatic dispersion coefficient Dt, also the chromatic dispersion slope st of a SMF optical fibre portion of 80 Km, (that is, at temperature Tz of 20° C. the ratio Dc(Tz)/sc(Tz) is almost equal to ratio Dt/st).

In turn, at temperature Tz of about 20° C., unit 100 having the holey optical fibre 12 with length Lc of about 4.89 Km is capable of compensating, besides the chromatic dispersion coefficient Dt, also the chromatic dispersion slope st of a SMF optical fibre portion of 100 Km.

The absolute value of the residual chromatic dispersion slope (residual_s) at the other temperatures comprised between −20 and 60° C. is less than or equal to, about 0.0014 ps/(nm$^2$*Km). That is, the above units 100 can be used in a 40 Gb/s WDM optical transmission system for compensating chromatic dispersion and chromatic dispersion slope of SMF optical transmission fibre portions in links having length up to about 8000 Km.

EXAMPLE 7.2

Moreover, the Applicant has determined the values of Dc(T), sc(T), Dc(T)/sc(T), Lc, Lt, Tx-Ty and residual_s in the case of a SMF optical transmission fibre and of a holey optical fibre 12 having a ratio d/Λ equal to about 0.5 and a pitch Λ equal to about 1.359 mm. The values thus found are shown in Tables 25 and 26.

TABLE 25

| T (° C.) | −20 | 20 | 60 |
|---|---|---|---|
| Dc(T) ps/(nm*km) | −67.242 | −65.362 | −63.483 |
| sc(T) ps/(nm$^2$*km) | −0.26075 | −0.26075 | −0.26075 |
| Dc(T)/sc(T) (nm-1) | 257.89 | 250.68 | 243.47 |

TABLE 26

| Lc (Km) | Lt (Km)-SMF | Tx–Ty | residual_s ps/(nm$^2$*km) |
|---|---|---|---|
| 20.8 | [77.7–82.3] | [−20/60° C.] | [−0.0014/+0.0017] |
| 26 | [97–102.8] | [−20/60° C.] | [−0.0015/+0.0016] |

Moreover, in this case, the unit 100 having the holey optical fibre 12 with length Lc of about 20.8 Km is capable of compensating, besides the chromatic dispersion coefficient Dt, also the chromatic dispersion slope st of a SMF optical fibre portion of 80 Km, at the temperature Tz of about 20° C. (that is, at the temperature Tz of 20° C., the ratio Dc(Tz)/sc(Tz) is almost equal to ratio Dt/st).

In turn, the unit 100 having the holey optical fibre 12 with length Lc of about 26 Km is capable of compensating, besides the chromatic dispersion coefficient Dt, also the chromatic dispersion slope st of a SMF optical fibre portion of 100 Km at the temperature Tz of about 20° C.

Comparing the values of table 24—obtained with a holey optical fibre 12 having a ratio d/Λ equal to about 0.9 and a pitch Λ equal to about 0.970 mm—with those of table 26—obtained with a holey optical fibre 12 having a ratio d/Λ equal to about 0.5 and a pitch Λ equal to about 1.359 mm—it can be noted that, decreasing ratio d/Λ:

the unit is less efficient (greater length Lc of the holey optical fibres 12);
the amplitude of the interval of lengths Lt that can be compensated is slightly greater;
the amplitude of the interval Tx-Ty has remained unchanged; and
the maximum absolute value of the residual_s is greater.

Moreover, the Applicant has found that a lower d/Λ ratio corresponds to a greater effective area of the holey optical fibre 12.

Figure 4:
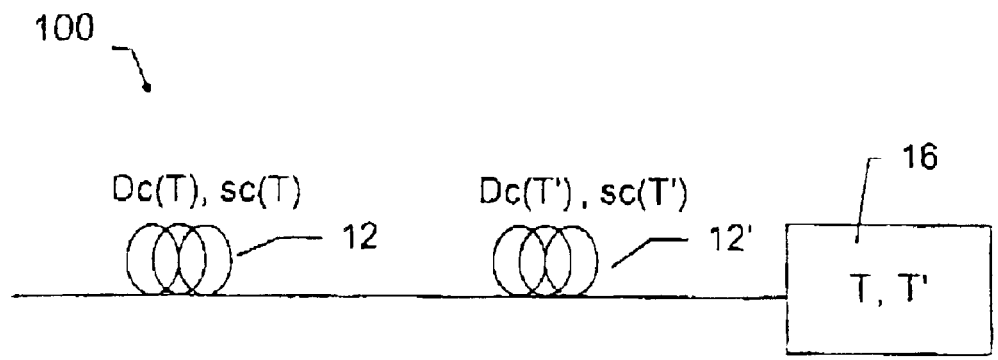
FIG. 4 shows a schematic representation of a second embodiment of a unit according to the invention.

FIG. 4 shows an alternative embodiment of unit 100. This embodiment is totally similar to that of FIG. 3a except in that it also comprises a second holey optical fibre 12' and that the temperature adjusting device 16 is also suitable for bringing and maintaining the second holey optical fibre 12' at a temperature T' selectable in a predetermined interval Tx'-Ty'.

Similarly to the first holey optical fibre 12, also the second holey optical fibre 12' has a length Lc', a core region 13' and a cladding region 14' surrounding the core region 13' (FIG. 1).

In the embodiment shown in FIG. 1, the cladding region 14' comprises two rings of holes surrounding the core region 13' and passing through the holey optical fibre portion 12' longitudinally for its entire length.

The two rings of holes have hexagonal shape. Moreover, the holes of the two rings have a substantially equal diameter d', and are spaced from one another according to a pitch Λ'.

For compensating at the preselected wavelength λ both the chromatic dispersion coefficient Dt and the chromatic dispersion slope st for different chromatic dispersion values Dt*Lt comprised in a predetermined interval, the hole diameter and pitch of the first and second holey fibre 12, 12', the lengths Lc and Lc', and the intervals of temperature Tx-Ty and Tx'-Ty' are advantageously selected so that at the preselected wavelength λ, the first and the second holey optical fibre 12, 12' have such value of chromatic dispersion slope sc(T) and, respectively, sc(T') and such value of chromatic dispersion coefficient Dc(T) and, respectively, Dc(T') that, as temperatures T, T' vary in a predetermined manner between value Tx and value Ty and, respectively, between value Tx' and value Ty', the following relation (J) is substantially satisfied $$\frac{Dt}{st} = \frac{\frac{Dc(T)}{sc(T)} * Lc + \frac{Dc(T')}{sc(T')} * Lc'}{Lc + Lc'}; \text{ and}$$

the first and the second holey optical fibre 12, 12' have such value of chromatic dispersion coefficients Dc(T) and, respectively, Dc(T') in function of temperature that, as temperatures T, T' vary in said predetermined manner between value Tx and value Ty and, respectively, between value Tx' and value Ty', the following relation (K) is substantially satisfied $$Dt*Lt = -[Dc(T)*Lc + Dc(T')*Lc']$$

for all values of chromatic dispersion Dt*Lt comprised in said predetermined interval of values.

As temperatures T and T' vary in predetermined manner in the intervals of temperatures Tx-Ty and Tx'-Ty', this last embodiment of the invention advantageously allows compensating, with a single unit 100, not only chromatic dispersion Dt*Lt of optical fibre portions having different lengths Lt and same chromatic dispersion coefficient Dt, but also the chromatic dispersion slope st.

In other words, this last embodiment allows compensating both the chromatic dispersion slope and the chromatic dispersion coefficient of optical transmission fibre portions of the same type (that is, having the same values of chromatic dispersion slope st and of chromatic dispersion coefficient Dt) but having different lengths Lt (that is, having different chromatic dispersion values Dt*Lt).

EXAMPLE 8

The Applicant has considered the case of compensating TW+ optical transmission fibre portions having lengths Lt comprised between about 90 and 110 km and a chromatic dispersion coefficient Dt equal to about 4 ps/(mn*Km), a chromatic dispersion slope st equal to about 0.0715 and a ratio Dt/st equal to about 55.9 (for chromatic dispersion values Dt*Lt in the case of a TW+ optical fibre, as length Lt varies, reference shall be made to the values shown in Table 2, first line).

Tables 27, 28 and 29 respectively show
the values of Dc(T) sc(T) and Dc(T)/sc(T) as temperature T of the first holey optical fibre 12 having a ratio d/Λ equal to about 0.9 and a pitch Λ equal to about 1.140 mm varies;
the values of Dc(T') sc(T') and Dc(T')/sc(T') as temperature T' of the second holey optical fibre 12' having a ratio d/Λ' equal to about 0.5 and a pitch Λ' equal to about 1.505 mm varies;
the values of Dc(T') sc(T') and Dc(T')/sc(T') as temperature T' of the second holey optical fibre 12' having a ratio d/Λ' equal to about 0.5 and a pitch Λ' equal to about 1.510 mm varies.

TABLE 27

| T (° C.) | Dc ps/(nm*km) | sc ps/(nm²*km) | Dc/sc (nm-1) |
|---|---|---|---|
| −20 | −47.68 | −0.805 | 59.19 |
| 20 | −43.13 | −0.796 | 54.18 |
| 60 | −38.59 | −0.785 | 49.17 |

TABLE 28

| T' (° C.) | Dc' ps/(nm*km) | sc' ps/(nm²*km) | Dc'/sc' (nm-1) |
|---|---|---|---|
| −20 | −14.8 | −0.219 | 67.7 |
| 20 | −13.3 | −0.217 | 61.14 |
| 60 | −11.75 | −0.215 | 54.58 |

TABLE 29

| T' (° C.) | Dc' ps/(nm*km) | sc' ps/(nm²*km) | Dc'/sc' (nm-1) |
|---|---|---|---|
| −20 | −13.3 | −0.218 | 61.1 |
| 20 | −11.7 | −0.213 | 54.83 |
| 60 | −10.12 | −0.229 | 44.05 |

With reference to the two optical fibres of tables 28 and 29, having the same ratio d/Λ' but different pitch Λ' by 5 nm, the Applicant notes that, as shown by the values of the same tables 28 and 29 and by the following tables 30–33, even though parameters Dc' and sc' are very sensitive to slight dimensional variations with respect to the considered dimensional scale, in the presence of such dimensional variations it is anyway possible to obtain the desired compensation of the chromatic dispersion and of the chromatic dispersion slope, by suitably selecting the pairs of temperature T and T' and the intervals Tx-Ty and Tx'-Ty'.

Table 30 shows the values of T, T', Lc, Lc', Lc+Lc', Lt, $Dc_j/sc_j$ (given by relation J) and residual_s in the case of intervals of temperatures Tx-Ty, Tx'-Ty' of 100 degrees and of a unit 100 having the first holey optical fibre 12 with the features shown in table 27 and the second holey optical fibre 12' with the features shown in table 28.

TABLE 30

| T (° C.) | T' (° C.) | Lc (km) | Lc' (km) | Lc + Lc' (km) | Lt TW+ (km) | $Dc_j/sc_j$ ($nm^{-1}$) | residual_s ps/nm²*km |
|---|---|---|---|---|---|---|---|
| −20 | −20 | 7.78 | 5.6 | 13.39 | 113.7 | 63 | 0.010 |
| +80 | −20 | 7.78 | 5.6 | 13.39 | 108.2 | 55.9 | 0 |
| −20 | +80 | 7.78 | 5.6 | 13.39 | 91.7 | 55.9 | 0 |
| +80 | +80 | 7.78 | 5.6 | 13.39 | 86.2 | 48.6 | −0.0046 |

The values of Table 30 show that, with a unit 100 having two holey optical fibres 12, 12' with the above features and lengths Lc and Lc' respectively of about 7.78 Km and 5.6 Km, it is possible to compensate the chromatic dispersion Dt*Lt of TW+ optical fibre portions having lengths comprised between about 86.2 and 113.7 as the pairs of temperature T, T' vary within the intervals of temperature Tx-Ty and Tx'-Ty' comprised between −20 and 80° C.

Moreover, by suitably selecting the pairs of temperature T, T' in said intervals of temperature Tx-Ty and Tx'-Ty', it is possible to compensate, besides chromatic dispersion Dt*Lt, also the chromatic dispersion slope st (null residual_s) of TW+ optical fibre portions having lengths comprised between about 91.7 and 108.2 Km.

Similarly, table 31 shows the values of T, T', Lc, Lc', Lc+Lc', Lt, and residual_s in the case of intervals of temperatures Tx-Ty of 80 degrees and Tx'-Ty' of 55 degrees, and of a unit 100 having the first holey optical fibre 12 with the features shown in table 27 and the second holey optical fibre 12' with the features shown in table 28.

TABLE 31

| T (° C.) | T' (° C.) | Lc (km) | Lc' (km) | Lc + Lc' (km) | Lt TW+ (km) | residual_s ps/nm²*km |
|---|---|---|---|---|---|---|
| −20 | 15 | 6.99 | 7.77 | 14.76 | 110 | 0.00658 |
| 60 | 15 | 6.99 | 7.77 | 14.76 | 106 | 0 |
| −20 | 70 | 6.99 | 7.77 | 14.76 | 94 | 0 |
| 60 | 70 | 6.99 | 7.77 | 14.76 | 90 | −0.0038 |

Similarly, table 32 shows the values of T, T', Lc, Lc', Lc+Lc', Lt, and residual_s in the case of intervals of temperatures Tx-Ty, Tx'-Ty' of 60 degrees and of a unit 100 having the first holey optical fibre 12 with the features shown in table 27 and the second holey optical fibre 12' with the features shown in table 29.

TABLE 32

| T (° C.) | T' (° C.) | Lc (km) | Lc' (km) | Lc + Lc' (km) | Lt TW+ (km) | residual_s ps/nm²*km |
|---|---|---|---|---|---|---|
| −20 | −20 | 7.57 | 5.33 | 12.9 | 107.8 | 0.0037 |
| 40 | −20 | 7.57 | 5.33 | 12.9 | 104.7 | 0 |
| −20 | 40 | 7.57 | 5.33 | 12.9 | 95.2 | 0 |
| 40 | 40 | 7.57 | 5.33 | 12.9 | 92.2 | −0.005 |

Comparing the values of table 32 with those of tables 12 and 14 relating to the similar case of compensation of TW+ optical transmission fibre with a unit 100 having a single holey optical fibre 12 and an interval of temperatures Tx-Ty of 60 degrees, it can be noted that, with respect to unit 100 with a single holey optical fibre 12, unit 100 with two holey optical fibres 12, 12' exhibits:
almost the same interval of lengths Lt of the TW+ optical transmission fibre portions that can be compensated, and smaller lengths Lc, Lc' of the single holey optical fibres 12, 12' (this allows simplifying the single fibre production process).

Figure 9:
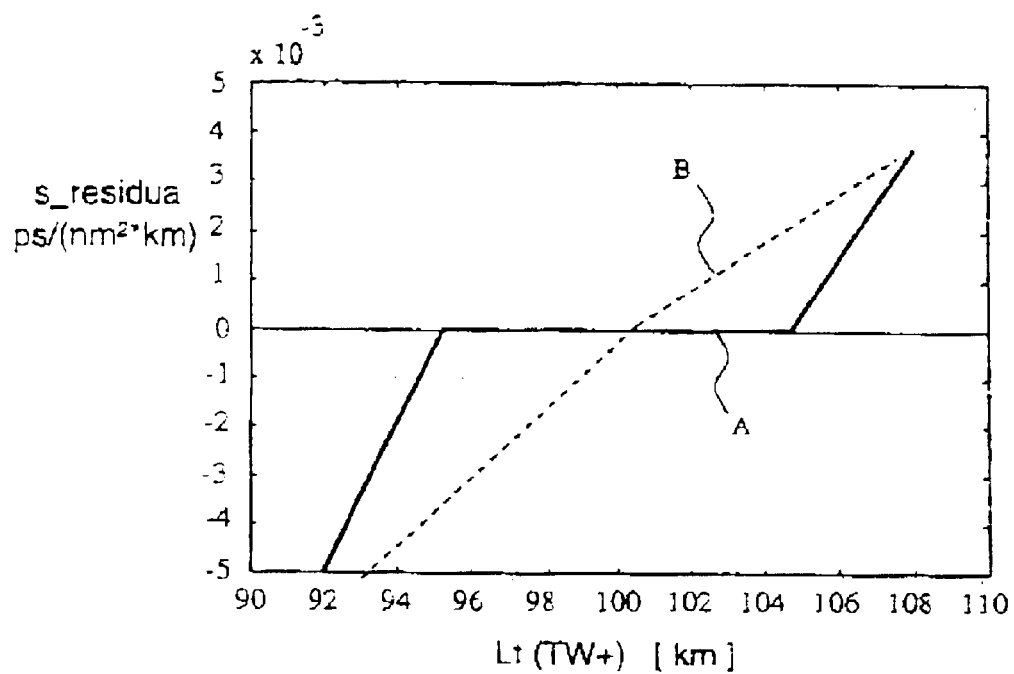
FIG. 9 shows the values of the residual chromatic dispersion slope (residual_s) at various lengths Lt of a TW+ optical transmission fibre portion to be compensated in the case of a unit 100 according to the values of table 32 (curve A) and in the case of a unit 100 according to the values of table 12 (curve B)

Moreover, FIG. 9 shows the values of the residual chromatic dispersion slope (residual_s) at the various lengths Lt of the TW+ optical transmission fibre portion to be compensated in the case of a unit 100 according to the values of table 32 (curve A) and in the case of a unit 100 according to the values of table 12 (curve B).

From such figure it can be noted that, in general, in the case of a unit 100 with two holey optical fibre portions 12, 12' the residual_s is much lower, in absolute value, with respect to the case of a unit 100 with a single holey optical fibre portion 12.

Finally, table 33 shows the values of T, T', Lc, Lc', Lc+Lc', Lt, and residual_s in the case of intervals of temperatures Tx-Ty, Tx'-Ty' of 40 degrees and of a unit 100 having the first holey optical fibre 12 with the features shown in table 27 and the second holey optical fibre 12' with the features shown in table 29.

TABLE 33

| T (° C.) | T' (° C.) | Lc (km) | Lc' (km) | Lc + Lc' (km) | Lt TW+ (km) | residual_s ps/nm$^2$*km |
|---|---|---|---|---|---|---|
| 0 | −20 | 7.6 | 5.7 | 13.3 | 105.37 | 0.00172 |
| 40 | −20 | 7.6 | 5.7 | 13.3 | 103.1 | 0 |
| 0 | 20 | 7.6 | 5.7 | 13.3 | 96.9 | 0 |
| 40 | 20 | 7.6 | 5.7 | 13.3 | 94.6 | −0.0043 |

In brief, a unit 100 having two holey optical fibres 12, 12' independently adjustable in temperature is preferable with respect to a unit 100 with a single holey optical fibre 12 both in terms of length of the single holey optical fibres 12, 12' and in terms of residual_s.

EXAMPLE 9

Moreover, the Applicant has considered the case of compensating TW optical transmission fibre portions having lengths Lt comprised between about 90 and 110 km and a chromatic dispersion coefficient Dt equal to about 2.4 ps/(mn*Km), a chromatic dispersion slope st equal to about 0.0716 and a ratio Dt/st equal to about 33.5 (for chromatic dispersion values Dt*Lt in the case of a TW optical fibre, as length Lt varies, reference shall be made to the values shown in Table 2, last line).

Tables 34 and 35 respectively show
the values of Dc(T) sc(T) and Dc(T)/sc(T) as temperature T of the first holey optical fibre 12 having a ratio d/Λ equal to about 0.9 and a pitch Λ equal to about 1.156 mm varies; and
the values of Dc(T') sc(T') and Dc(T')/sc(T') as temperature T' of the second holey optical fibre 12' having a ratio d/Λ' equal to about 0.5 and a pitch Λ' equal to about 1.525 mm varies.

TABLE 34

| T (° C.) | Dc ps/(nm*km) | sc ps/(nm$^2$*km) | Dc/sc (nm-1) |
|---|---|---|---|
| −20 | −29.774 | −0.759 | 39.22 |
| 20 | −25.49 | −0.749 | 33.96 |
| 60 | −21.219 | −0.739 | 28.71 |

TABLE 35

| T' (° C.) | Dc' ps/(nm*km) | sc' ps/(nm$^2$*km) | Dc'/sc' (nm-1) |
|---|---|---|---|
| −20 | −8.9 | −0.2106 | 42.28 |
| 20 | −7.415 | −0.2085 | 35.5 |
| 60 | −5.93 | −0.2064 | 28.73 |

Table 36 shows the values of T, T', Lc, Lc', Lc+Lc', Lt, $Dc_j/sc_j$ (given by the above relation J) and residual_s in the case of intervals of temperatures Tx-Ty of 80 degrees and Tx'-Ty' of 50 degrees and of a unit 100 having the first holey optical fibre 12 with the features shown in table 34 and the second holey optical fibre 12' with the features shown in table 35.

TABLE 36

| T (° C.) | T' (° C.) | Lc (km) | Lc' (km) | Lc + Lc' (km) | Lt TW (km) | $Dc_j/sc_j$ (nm$^{-1}$) | residual_s ps/nm$^2$*km |
|---|---|---|---|---|---|---|---|
| −20 | 10 | 7.17 | 8.38 | 15.55 | 115.8 | 38.4 | 0.0077 |
| 60 | 10 | 7.17 | 8.38 | 15.55 | 109.5 | 33.5 | 0 |
| −20 | 60 | 7.17 | 8.38 | 15.55 | 90.5 | 33.5 | 0 |
| 60 | 60 | 7.17 | 8.38 | 15.55 | 84 | 28.7 | −0.009 |

The values of Table 36 show that, with a unit 100 having two holey optical fibres 12, 12' with the above features and lengths Lc and Lc' respectively of about 7.17 Km and 8.38 Km, it is possible to compensate the chromatic dispersion Dt*Lt of TW optical fibre portions having lengths comprised between about 84 and 115.8 as the pairs of temperature T, T' vary within the intervals of temperature Tx-Ty and Tx'-Ty' comprised between −20 and 60° C. and, respectively, 10 and 60° C.

Moreover, by suitably selecting the pairs of temperature T, T' in said intervals of temperature Tx-Ty and Tx'-Ty', it is possible to compensate, besides chromatic dispersion Dt*Lt, also the chromatic dispersion slope st (null residual_s) of TW optical fibre portions having lengths comprised between about 90.5 and 109.5 Km.

Similarly, table 37 shows the values of T, T', Lc, Lc', Lc+Lc', Lt, $Dc_j/sc_j$ (given by relation J) and residual_s in the case of intervals of temperatures Tx-Ty of 60 degrees and Tx'-Ty' of 35 degrees and of a unit 100 having the first holey optical fibre 12 with the features shown in table 34 and the second holey optical fibre 12' with the features shown in table 35.

TABLE 37

| T (° C.) | T' (° C.) | Lc (km) | Lc' (km) | Lc + Lc' (km) | Lt TW (km) | $Dc_j/sc_j$ (nm$^{-1}$) | residual_s ps/nm$^2$*km |
|---|---|---|---|---|---|---|---|
| −10 | 15 | 6.27 | 11.42 | 17.69 | 114.28 | 37.31 | 0.0069 |
| 50 | 15 | 6.27 | 11.42 | 17.69 | 108.13 | 33.5 | 0 |
| −10 | 50 | 6.27 | 11.42 | 17.69 | 91.86 | 33.5 | 0 |
| 50 | 50 | 6.27 | 11.42 | 17.69 | 85.7 | 29.81 | −0.0073 |

Finally, table 38 shows the values of T, T', Lc, Lc', Lc+Lc', Lt, $Dc_j/sc_j$ (given by relation J) and residual_s in the case of intervals of temperatures Tx-Ty of 40 degrees and Tx'-Ty' of 30 degrees and of a unit 100 having the first holey optical fibre 12 with the features shown in table 34 and the second holey optical fibre 12' with the features shown in table 35.

TABLE 38

| T (° C.) | T' (° C.) | Lc (km) | Lc' (km) | Lc + Lc' (km) | Lt TW (km) | $Dc_j/sc_j$ $(nm^{-1})$ | residual_s $ps/nm^2 \cdot km$ |
|---|---|---|---|---|---|---|---|
| 0 | 20 | 7.44 | 7.32 | 14.76 | 108.29 | 36.21 | 0.005 |
| 0 | 20 | 7.44 | 7.32 | 14.76 | 104.93 | 33.5 | 0 |
| 40 | 50 | 7.44 | 7.32 | 14.76 | 95 | 33.5 | 0 |
| 40 | 50 | 7.44 | 7.32 | 14.76 | 91.67 | 30.91 | −0.0047 |

Comparing the values of table 38 with those of tables 16 and 18 relating to the similar case of compensation of TW optical transmission fibre with a unit 100 having a single holey optical fibre 12 and an interval of temperatures Tx-Ty of 40 degrees, it can be noted that, with respect to unit 100 with a single holey optical fibre 12, unit 100 with two holey optical fibres 12, 12' exhibits:

- almost the same interval of lengths Lt of the TW optical transmission fibre portions that can be compensated, and
- smaller lengths Lc, Lc' of the single holey optical fibres 12, 12' (this allows simplifying the single fibre production process).

Figure 10:
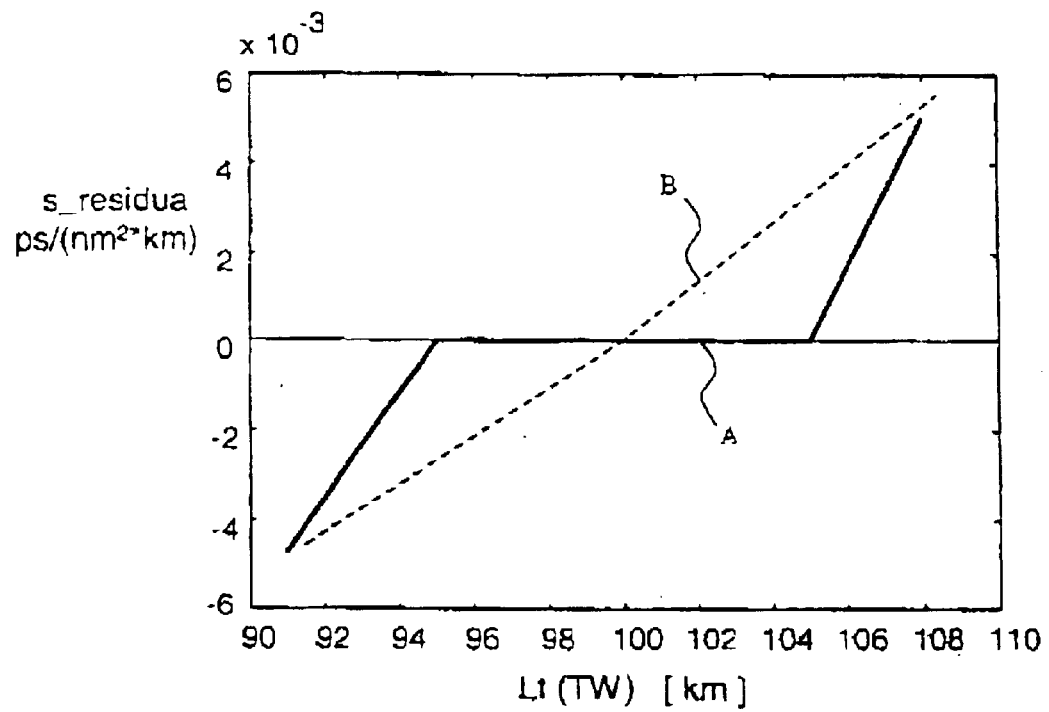
FIG. 10 shows the values of the residual chromatic dispersion slope (residual_s) at various lengths Lt of a TW optical transmission fibre portion to be compensated in the case of a unit 100 according to the values of table 38 (curve A) and in the case of a unit 100 according to the values of table 16 (curve B)

Moreover, FIG. 10 shows the values of the residual chromatic dispersion slope (residual_s) at the various lengths Lt of the TW optical transmission fibre portion to be compensated in the case of a unit 100 according to the values of table 38 (curve A) and in the case of a unit 100 according to the values of table 16 (curve B).

From such figure it can be noted that, in general, in the case of a unit 100 with two holey optical fibre portions 12, 12' the residual_s is much lower, in absolute value, with respect to the case of a unit 100 with a single holey optical fibre portion 12.

EXAMPLE 10

Moreover, the Applicant has considered the case of compensating TW RS optical transmission fibre portions having lengths Lt comprised between about 90 and 110 km and a chromatic dispersion coefficient Dt equal to about 5.7 ps/(mn*Km), a chromatic dispersion slope st equal to about 0.045 and a ratio Dt/st equal to about 126.7 (for chromatic dispersion values Dt*Lt in the case of a TW RS optical fibre, as length Lt varies, reference shall be made to the values shown in Table 8).

Tables 39 and 40 respectively show
- the values of Dc(T), sc(T) and Dc(T)/sc(T) as temperature T of the first holey optical fibre 12 having a ratio d/Λ equal to about 0.9 and a pitch Λ equal to about 1.079 mm varies; and
- the values of Dc(T'), sc(T') and Dc(T')/sc(T') as temperature T' of the second holey optical fibre 12' having a ratio d/Λ' equal to about 0.5 and a pitch Λ' equal to about 1.450 mm varies.

TABLE 39

| T (° C.) | Dc ps/(nm*km) | sc ps/(nm²*km) | Dc/sc (nm-1) |
|---|---|---|---|
| −20 | −131.46 | −1.002 | 131.13 |
| 20 | −125.76 | −0.9911 | 126.88 |
| 60 | −120.06 | −0.9803 | 122.4 |

TABLE 40

| T' (° C.) | Dc' ps/(nm*km) | sc' ps/(nm²*km) | Dc'/sc' (nm-1) |
|---|---|---|---|
| −20 | −31.79 | −0.24 | 132.46 |
| 20 | −30.113 | −0.2385 | 126.22 |
| 60 | −28.428 | −0.237 | 119.8 |

Table 41 shows the values of T, T', Lc, Lc', Lc+Lc', Lt, $Dc_j/sc_j$ (given by the above relation J) and residual_s in the case of intervals of temperatures Tx-Ty, Tx'-Ty' of 80 degrees and of a unit 100 having the first holey optical fibre 12 with the features shown in table 39 and the second holey optical fibre 12' with the features shown in table 40.

TABLE 41

| T (° C.) | T' (° C.) | Lc (km) | Lc' (km) | Lc + Lc' (km) | Lt TW RS (km) | $Dc_j/sc_j$ $(nm^{-1})$ | residual_s $ps/(nm^2 \cdot km)$ |
|---|---|---|---|---|---|---|---|
| −20 | −20 | 3.92 | 2.55 | 6.47 | 104.7 | 131.95 | 0.00145 |
| 60 | −20 | 3.92 | 2.55 | 6.47 | 103.2 | 126.7 | 0 |
| −20 | 60 | 3.92 | 2.55 | 6.47 | 96.8 | 126.7 | 0 |
| 60 | 60 | 3.92 | 2.55 | 6.47 | 95.3 | 121.37 | −0.0015 |

The values of Table 41 show that, with a unit 100 having two holey optical fibres 12, 12' with the above features and lengths Lc and Lc' respectively of about 3.92 Km and 2.55 Km, it is possible to compensate the chromatic dispersion Dt*Lt of TW RS optical fibre portions having lengths comprised between about 95.3 and 104.7 as the pairs of temperature T, T' vary within the intervals of temperature Tx-Ty and Tx'-Ty' comprised between −20 and 60° C.

Moreover, by suitably selecting the pairs of temperature T, T' in said intervals of temperature Tx-Ty and Tx'-Ty', it is possible to compensate, besides chromatic dispersion Dt*Lt, also the chromatic dispersion slope st (null residual_s) of TW RS optical fibre portions having lengths comprised between about 96.8 and 103.2 Km.

Comparing the values of table 41 with those of tables 20 and 22 relating to the similar case of compensation of TW RS optical transmission fibre with a unit 100 having a single holey optical fibre 12 and an interval of temperatures Tx-Ty of 80 degrees, it can be noted that, with respect to unit 100 with a single holey optical fibre 12, unit 100 with two holey optical fibres 12, 12' exhibits:

- almost the same interval of lengths Lt of the TW RS optical transmission fibre portions that can be compensated, and
- smaller lengths Lc, Lc' of the single holey optical fibres 12, 12' (this allows simplifying the single fibre production process).

Figure 11:
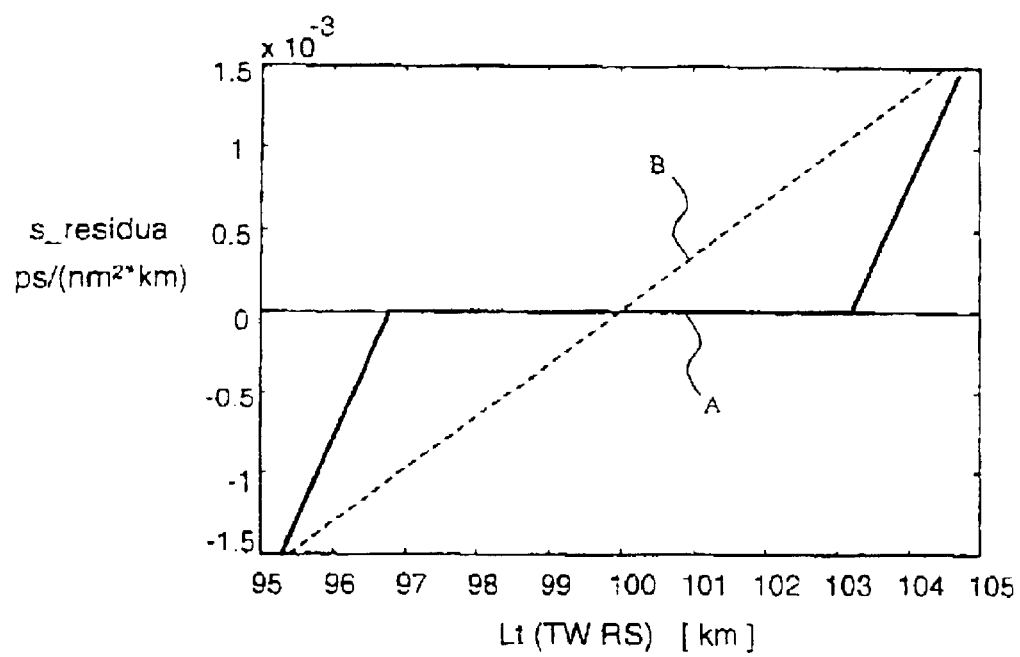
FIG. 11 shows the values of the residual chromatic dispersion slope (residual_s) at various lengths Lt of a TW RS optical transmission fibre portion to be compensated in the case of a unit 100 according to the values of table 41 (curve A) and in the case of a unit 100 according to the values of table 20 (curve B)

Moreover, FIG. 11 shows the values of the residual chromatic dispersion slope (residual_s) at the various lengths Lt of the TW RS optical transmission fibre portion to be compensated in the case of a unit 100 according to the values of table 41 (curve A) and in the case of a unit 100 according to the values of table 20 (curve B).

From such figure it can be noted that, in general, in the case of a unit 100 with two holey optical fibre portions 12, 12' the residual_s is much lower, in absolute value, with respect to the case of a unit 100 with a single holey optical fibre portion 12.

Finally, table 42 shows the values of T, T', Lc, Lc', Lc+Lc', Lt, $Dc_j/sc_j$ (given by relation J) and residual_s in the case of intervals of temperatures Tx-Ty, Tx'-Ty' of 60 degrees and of a unit 100 having the first holey optical fibre 12 with the features shown in table 39 and the second holey optical fibre 12' with the features shown in table 40.

TABLE 42

| T (° C.) | T' (° C.) | Lc (km) | Lc' (km) | Lc + Lc' (km) | Lt TW RS (km) | Dc$_j$/sc$_j$ (nm$^{-1}$) | residual_s ps/(nm$^2$*km) |
|---|---|---|---|---|---|---|---|
| −10 | −10 | 3.9 | 2.55 | 6.46 | 103.2 | 130.64 | 0.00114 |
| 50 | −10 | 3.9 | 2.55 | 6.46 | 102.2 | 126.7 | 0 |
| −10 | 50 | 3.9 | 2.55 | 6.46 | 97.8 | 126.7 | 0 |
| 50 | 50 | 3.9 | 2.55 | 6.46 | 96.7 | 122.68 | −0.00114 |

EXAMPLE 11

The Applicant has considered the case of compensating SMF optical transmission fibre portions having lengths Lt comprised between about 90 and 110 km and a chromatic dispersion coefficient Dt equal to about 17 ps/(mn*Km), a chromatic dispersion slope st equal to about 0.0677 and a ratio Dt/st equal to about 251 (for chromatic dispersion values Dt*Lt in the case of a SMF optical fibre, as length Lt varies, reference shall be made to the values shown in Table 5).

Tables 43 and 44 respectively show the values of Dc(T), sc(T) and Dc(T)/sc(T) as temperature T of the first holey optical fibre 12 having a ratio d/Λ equal to about 0.9 and a pitch Λ equal to about 0.970 mm varies; and the values of Dc(T'), sc(T') and Dc(T')/sc(T') as temperature T' of the second holey optical fibre 12' having a ratio d/Λ' equal to about 0.5 and a pitch Λ' equal to about 1.359 mm varies.

TABLE 43

| T (° C.) | Dc ps/(nm*km) | sc ps/(nm$^2$*km) | Dc/sc(nm − 1) |
|---|---|---|---|
| −20 | −355.15 | −1.3834 | 256.72 |
| 20 | −347.11 | −1.3749 | 252.46 |
| 60 | −339.07 | −1.3665 | 248.13 |

TABLE 44

| T' (° C.) | Dc' ps/(nm*km) | sc' ps/(nm$^2$*km) | Dc'/sc' (nm − 1) |
|---|---|---|---|
| −20 | −67.24 | −0.26075 | 257.89 |
| 20 | −65.36 | −0.26075 | 250.68 |
| 60 | −63.48 | −0.26075 | 243.47 |

Table 45 shows the values of T, T', Lc, Lc', Lc+Lc', Lt, Dc$_j$/sc$_j$ (given by the above relation J) and residual_s in the case of intervals of temperatures Tx-Ty of 80 degrees and Tx'-Ty' of 60 degrees and of a unit 100 having the first holey optical fibre 12 with the features shown in table 43 and the second holey optical fibre 12' with the features shown in table 44.

TABLE 45

| T (° C.) | T' (° C.) | Lc (km) | Lc' (km) | Lc + Lc' (km) | Lt SMF (km) | Dc$_j$/sc$_j$ (nm$^{-1}$) | residual_s ps/nm$^2$*km |
|---|---|---|---|---|---|---|---|
| −20 | 0 | 4.25 | 3.43 | 7.68 | 102.3 | 255.5 | 0.00133 |
| 60 | 0 | 4.25 | 3.43 | 7.68 | 101.8 | 251 | 0 |

TABLE 45-continued

| T (° C.) | T' (° C.) | Lc (km) | Lc' (km) | Lc + Lc' (km) | Lt SMF (km) | Dc$_j$/sc$_j$ (nm$^{-1}$) | residual_s ps/nm$^2$*km |
|---|---|---|---|---|---|---|---|
| −20 | 60 | 4.25 | 3.43 | 7.68 | 98.3 | 251 | 0 |
| 60 | 60 | 4.25 | 3.43 | 7.68 | 97.7 | 246 | −0.00082 |

The values of Table 45 show that, with a unit 100 having two holey optical fibres 12, 12' with the above features and lengths Lc and Lc' respectively of about 4.25 Km and 3.43 Km, it is possible to compensate chromatic dispersion Dt*Lt of SMF optical fibre portions having lengths comprised between about 97.7 and 102.3 as the pairs of temperature T, T' vary within the intervals of temperature Tx-Ty and Tx'-Ty' comprised between −20 and 60° C. and, respectively, 0 and 60° C.

Moreover, by suitably selecting the pairs of temperature T, T' in said intervals of temperature Tx-Ty and Tx'-Ty', it is possible to compensate, besides chromatic dispersion Dt*Lt, also the chromatic dispersion slope st (null residual_s) of SMF optical fibre portions having lengths comprised between about 98.3 and 101.8 Km.

Comparing the values of table 45 with those of tables 24 and 26 relating to the similar case of compensation of SMF optical transmission fibre with a unit 100 having a single holey optical fibre 12 and an interval of temperatures Tx-Ty of 80 degrees, it can be noted that, with respect to unit 100 with a single holey optical fibre 12, unit 100 with two holey optical fibres 12, 12' exhibits:

almost the same interval of lengths Lt of the SMF optical transmission fibre portions that can be compensated, and smaller lengths Lc, Lc' of the single holey optical fibres 12, 12' (this allows simplifying the single fibre production process).

Figure 12:
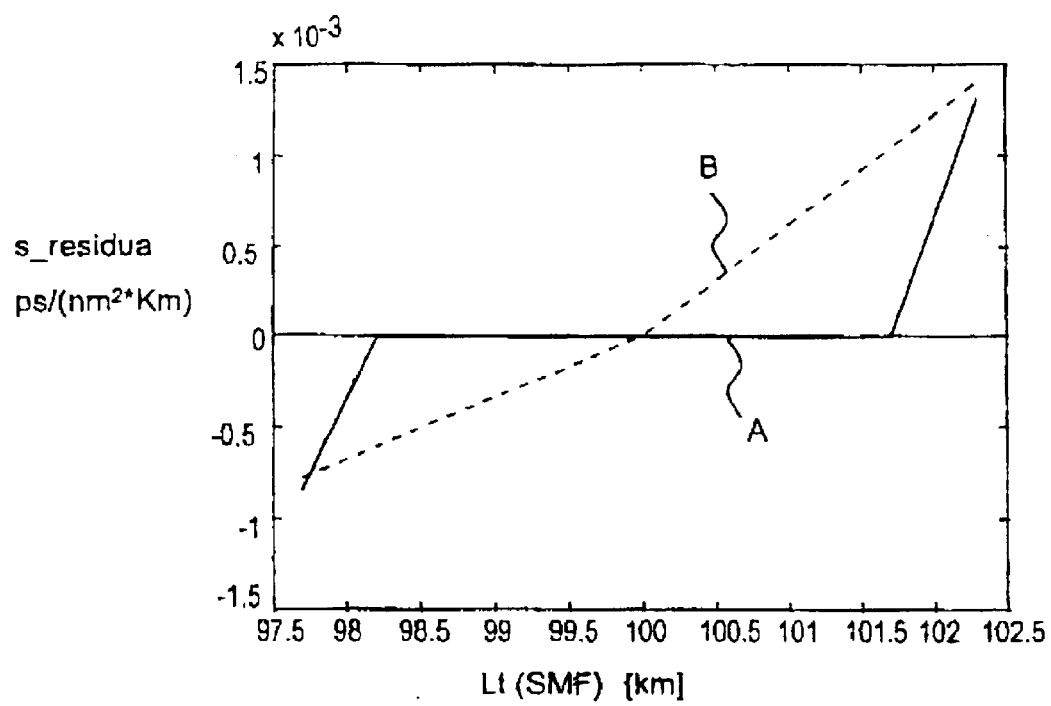
FIG. 12 shows the values of the residual chromatic dispersion slope (residual_s) at various lengths Lt of an SMF optical transmission fibre portion to be compensated in the case of a unit 100 according to the values of table 45 (curve A) and in the case of a unit 100 according to the values of table 24 (curve B)

Moreover, FIG. 12 shows the values of the residual chromatic dispersion slope (residual_s) at the various lengths Lt of the SMF optical transmission fibre portion to be compensated in the case of a unit 100 according to the values of table 45 (curve A) and in the case of a unit 100 according to the values of table 24 (curve B).

From such figure it can be noted that, in general, in the case of a unit 100 with two holey optical fibre portions 12, 12' the residual_s is much lower, in absolute value, with respect to the case of a unit 100 with a single holey optical fibre portion 12.

Finally, table 46 shows the values of T, T', Lc, Lc', Lc+Lc', Lt, Dc$_j$/sc$_j$ (given by relation J) and residual_s in the case of intervals of temperatures Tx-Ty of 60 degrees and Tx'-Ty' of 45 degrees and of a unit 100 having the first holey optical fibre 12 with the features shown in table 43 and the second holey optical fibre 12' with the features shown in table 44.

TABLE 46

| T (° C.) | T' (° C.) | Lc (km) | Lc' (km) | Lc + Lc' (km) | Lt SMF (km) | Dc$_j$/sc$_j$ (nm$^{-1}$) | residual_s ps/nm$^2$*km |
|---|---|---|---|---|---|---|---|
| −20 | 15 | 4.24 | 3.41 | 7.65 | 101.7 | 254.3 | 0.00126 |
| 40 | 15 | 4.24 | 3.41 | 7.65 | 101.3 | 251 | 0 |
| −20 | 60 | 4.24 | 3.41 | 7.65 | 98.7 | 251 | 0 |
| 40 | 60 | 4.24 | 3.41 | 7.65 | 98.3 | 247.2 | −0.00036 |

Unit 100 of the invention can be used for compensating the chromatic dispersion, and optionally, the chromatic dispersion slope, of an optical transmission fibre portion of an optical communication line.

Figure 5:
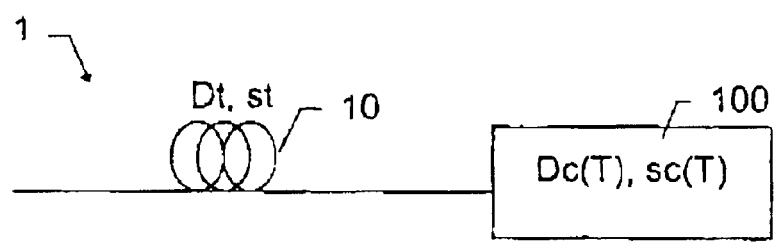
FIG. 5 shows a schematic representation of a first embodiment of an optical communication line according to the invention.

For example, FIG. 5 shows an optical communication line 1 according to an aspect of the invention, comprising a portion of optical transmission fibre 10 and a unit 100, located downstream of portion 10.

The optical transmission fibre portion 10 is an optical fibre portion conventionally used for telecommunications.

More in particular, it is a portion of optical fibre comprising a core and a cladding, both made of a typically silica-based vitreous material, in which the refractive index difference between core and cladding is obtained by incorporating suitable dopants in the vitreous matrix of the core and/or cladding.

Typical examples of such optical fibres are, as already said above, a conventional SMF optical fibre, a True Wave™ optical fibre, a True Wave Plus™ optical fibre, a True Wave RS™ optical fibre, a LEAF optical fibre, a LEAF Enhanced optical fibre, and a FreeLight™ optical fibre.

The portion of optical transmission fibre 10 has, at a wavelength $\lambda$, a chromatic dispersion coefficient Dt and a chromatic dispersion slope st, that are typically positive.

Moreover, it has a length Lt that can range between some tenths of kilometres and some hundreds of kilometres. Typically, it has a length Lt comprised between 30 and 200 Km.

Unit 10 has the holey optical fibre 12 specifically designed and the temperature adjusting device 16 specifically adjusted so as to compensate the chromatic dispersion Dt and, optionally, the chromatic dispersion slope st of the optical transmission fibre portion 10 having length Lt.

In an alternative embodiment (not shown), the optical transmission line 1 is totally similar to that of FIG. 5 except in that it also comprises a conventional compensator device for compensating the chromatic dispersion, located between the optical transmission fibre portion 10 and unit 100.

In this last embodiment, unit 10 has the holey optical fibre 12 specifically designed and the temperature adjusting device 16 specifically adjusted so as to compensate the residual chromatic dispersion Dt after the passage of an optical signal through the conventional compensator device and, optionally, the chromatic dispersion slope st of the optical transmission fibre portion 10 having length Lt.

The compensator device consists, for example, of a conventional optical circulator associated to a suitable chirped optical fibre Bragg grating or of a conventional optical fibre for compensating the chromatic dispersion.

The use of a conventional compensator device can, for example, be suitable in the case of optical transmission fibre portions 10 of the SMF or TW RS™ type having relatively high values of chromatic dispersion Dt.

In fact, in this case, the conventional compensator device can be suitably selected to bring the chromatic dispersion value Dt of such fibre portions to a value comparable to that of TW+™, Free Light™, LEAF, LEAF Enhanced and TW™ fibres (see values of table 1) thus allowing the use of two units 100 similar to those of example 1 also for compensating, in a reconfigurable manner, the chromatic dispersion Dt*Lt of SMF and TW RS™ optical transmission fibre portions.

Figure 6:
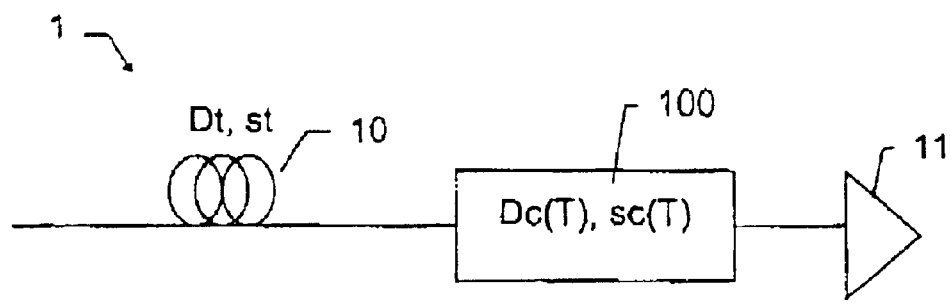
FIG. 6 shows a schematic representation of a second embodiment of an optical communication line according to the invention.

According to an embodiment shown in FIG. 6, besides the portion of optical transmission fibre 10 and unit 100, the optical communication line 1 also comprises an optical amplifier 11, located downstream of unit 100.

Figure 8:
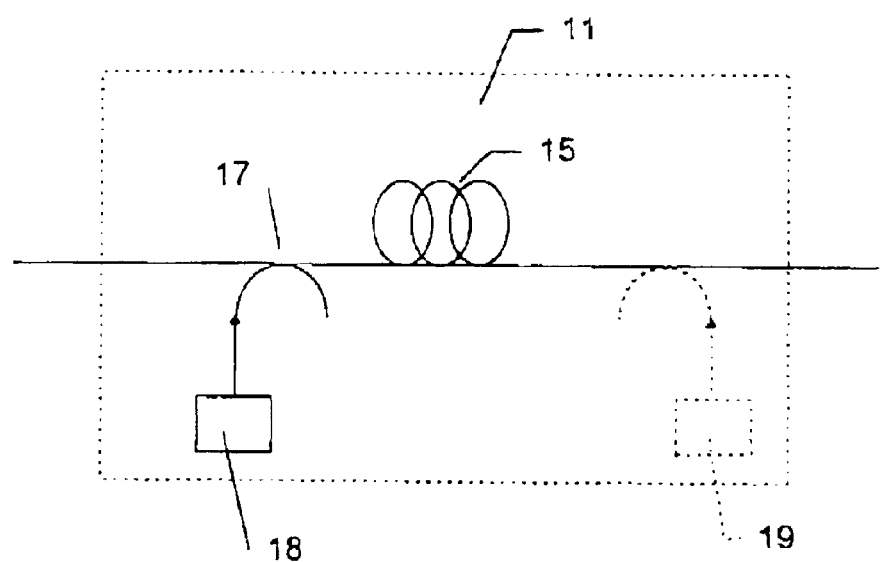
FIG. 8 shows a schematic representation of an optical amplifier suitable to be used in the line of FIG. 6 and in the system of FIG. 7.

As shown in FIG. 8, the optical amplifier 11 can comprise a portion of optical fibre 15 doped with erbium, and a pump source 18 (for example, a laser source) for pumping the optical fibre 15 at a pumping wavelength $\lambda$.p. The pump source 18 is coupled to an input end of the optical fibre 15 through a wavelength selective coupler 17 (for example, of the fused fibre type) so that the signal and pumping light propagate together through the optical fibre 15.

However, according to the system requirements, the pump source 18 can also be coupled to the output end of the optical fibre 15 (as indicated with reference numeral 19 with a broken line) so that the signal and pumping light propagate in opposed directions through fibre 15.

Alternatively, each end of fibre 15 can be coupled to a respective pump source.

In the case of erbium-dope optical fibre 15, wavelength $\lambda_p$ of the pumping signal typically is equal to about 980 or 1480 nm.

The described optical amplifier 11 can optionally comprise more than one optical amplification stage.

Typically, according to an embodiment not shown, the optical communication line 1 of the invention comprises a plurality of optical transmission fibre portions 10, a plurality of optical amplifiers 11 located between one portion of optical transmission fibre 10 and the other one and at least one unit 100 according to the invention, for compensating at least partly the chromatic dispersion and/or the chromatic dispersion slope of the plurality of optical transmission fibre portions 10.

Such unit 100 can be located at the beginning, at the end or into said optical communication line 1. Advantageously, it is inserted in line 1 between an optical transmission fibre portion 10 and an optical amplifier 11.

Figure 7:
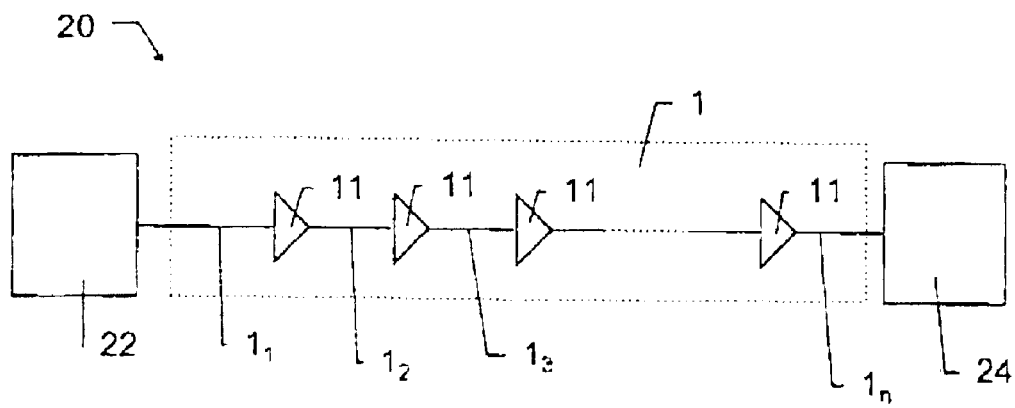
FIG. 7 shows a schematic representation of an optical communication system according to the invention.

FIG. 7 shows an optical communication system 20 according to the invention, comprising a transmitting station 22 for providing a signal at a signal wavelength $\lambda$, a receiving station 24 for receiving said signal, and an optical communication line 1 according to the invention, for transmitting the signal from the transmitting station 22 to the receiving station 24.

According to a preferred embodiment, the optical communication system 20 is a WDM system.

In this case, the transmitting station 22 is a conventional WDM equipment suitable for providing N optical signals having wavelengths $\lambda 1, \lambda 2 \ldots \lambda N$ differing from one another, multiplexing them in wavelength and sending them over the optical communication line 1.

Moreover, the transmitting station 22 also comprises an optical power amplifier (booster, not shown) for amplifying the WDM optical signal before sending it along line 1 (or a certain number of optical power amplifiers in parallel for amplifying optical signals comprised in different wavelength bands).

Such wavelengths $\lambda 1, \lambda 2 \ldots \lambda N$ are advantageously selected in an interval of wavelengths comprised between about 1500 nm and 1600 nm.

For example, the communication system 10 can be a WDM system with 128 channels spaced from each other by 50 GHz and divided into three bands: 16 channels between 1529 and 1535 nm (first band); 48 channels between 1541 and 1561 nm (second band) and 64 channels between 1575 and 1602 nm (third band).

Said receiving station 24 comprises a conventional equipment suitable for demultiplexing said N optical signals and sending them to further optional processing stages. Moreover, said receiving station 24 typically comprises also an optical preamplifier (not shown) suitable for bringing the WDM optical signal at a power level suitable for being received by the receiving equipment (or a certain number of optical preamplifiers in parallel for amplifying the optical signals comprised in different wavelength bands).

Line 1 comprises a plurality of optical amplifiers 11, of the type described with reference to FIG. 8, for amplifying a signal coming from an upstream portion of line, wherein the signal has attenuated during its propagation along it, and sending it in a downstream portion of line.

Alternatively, in place of each optical amplifier 11, line 1 can comprise a number of optical amplifiers arranged in parallel for amplifying the optical signals comprised in different wavelength bands (for example, the first, second and third band mentioned above).

For example, system 20 can be a submarine optical communication system wherein line 1 comprises a plurality of spans $1_1$, $1_2$, $1_3$, . . . $1_n$ respectively connecting the transmitting station 22 to the first amplifier 11, such amplifier 11 to the next one, and the last amplifier 11 to the receiving station 24.

Each span $1_1$, $1_2$, . . . $1_n$ comprises, for example, an optical transmission fibre cable 10 and a unit 100 according to the invention (not shown in FIG. 7).

Alternatively, unit 100 is only inserted in the last span $1_n$ before the receiving station 24 and/or only in some spans $1_1$, $1_2$, . . . $1_n$, according to the applications.

What is claimed is:

1. A unit comprising:

a portion of holey optical fibre having a length Lc comprising a core region and a cladding region, said cladding region comprising, in turn, a plurality of holes passing through it longitudinally and arranged so as to lower a refractive index of the cladding region with respect to a refractive index of the core region in a way to induce guided propagation by the core region, said holes having a respective diameter and being spaced, two by two, according to a respective pitch; and a temperature adjusting device for bringing and maintaining the portion of holey optical fibre at temperature values T selectable in an interval of temperatures Tx-Ty, the interval being predetermined based on at least the diameter and the pitch.

2. A unit according to claim 1, wherein the cladding region of the holey optical fibre portion comprises a first ring of holes around the core region.

3. A unit according to claim 2, wherein the holes of said first ring have a mean diameter d and are spaced from one another by a mean pitch Λ.

4. A unit according to claim 3, having a d/Λ ratio of more than 0.7.

5. A unit according to claim 1, wherein, for compensating chromatic dispersion values Dt*Lt comprised in a predetermined interval of values, in a reconfigurable manner at a preselected wavelength λ, the hole diameter and pitch, the length Lc and the interval of temperature Tx-Ty are selected so that at the preselected wavelength λ, the holey optical fibre has such values of the chromatic dispersion coefficient Dc(T) in function of the temperature that, as temperature T varies between the value Tx and the value Ty, the following relation Dt*Lt=−DC(T)*Lc is substantially satisfied for all chromatic dispersion values Dt*Lt comprised in said predetermined interval of values.

6. A unit according to claim 1, wherein, to compensate at a preselected wavelength λ and at a preselected temperature Tz comprised in the interval Tx-Ty, a predetermined value of chromatic dispersion slope st and a predetermined value of chromatic dispersion Dt*Lt, the hole diameter and pitch, the length Lc and the interval of temperature Tx-Ty are selected so that at the preselected wavelength λ, the holey optical fibre has such values of the chromatic dispersion slope sc(T) and of the chromatic dispersion coefficient Dc(T) in function of the temperature, as to substantially satisfy the following relations at the temperature Tz $$Dt/st=Dc(Tz)/sc(Tx) \text{ and } Dt*Lt=-Dc(Tz)*Lc.$$

7. A unit according to claim 1, comprising a second portion of holey optical fibre having a predetermined length Lc' comprising a core region and a cladding region, said cladding region comprising, in turn, a plurality of holes passing through it longitudinally and arranged so as to lower a refractive index of the cladding region with respect to a refractive index of the core region in a way to induce guided propagation by the core region, said holes having a respective diameter and being spaced, two by two, according to a respective pitch.

8. A unit according to claim 7, wherein the temperature adjusting device is also suitable for bringing and maintaining the second holey optical fibre at temperature values T' selectable in a second predetermined interval of temperatures Tx'-Ty'.

9. A unit according to claim 8, wherein, for compensating in a reconfigurable manner at the preselected wavelength λ, chromatic dispersion values Dt*Lt comprised in a predetermined interval of values, the hole diameter and pitch of the holes of the first and second holey optical fibre, the lengths Lc and Lc', and the intervals of temperature Tx-Ty and Tx'-Ty' are selected so that at the preselected wavelength λ, the first and the second holey optical fibres have such values of the chromatic dispersion coefficient Dc(T) and, respectively, Dc(T'), in function of the temperature that, as temperatures T, T' vary, in a predetermined manner, between the value Tx and the value Ty, and respectively, between the value Tx' and Ty', the following relation (K) is substantially satisfied $$Dt*Lt=-[Dc(T)*Lc+Dc(T')*Lc']$$

for all values of chromatic dispersion Dt*Lt comprised in said predetermined interval of values.

10. A unit according to claim 9, wherein, to compensate at the preselected wavelength λ and as temperatures T, T' vary, also a predetermined ratio Dt/st between the chromatic dispersion coefficient Dt and a chromatic dispersion slope st, the hole diameter and pitch of the first and second holey fibres, the lengths Lc and Lc' and the intervals of temperature Tx-Ty and Tx'-Ty' are also selected so that, at the preselected wavelength λ, the first and second holey optical fibres have such values of the chromatic dispersion slope sc(T) and, respectively, sc(T') and such values of the chromatic dispersion coefficient Dc(T) and, respectively, Dc(T') in function of temperatures T and T' that, as the temperatures T, T' vary in said predetermined manner between the value Tx and the value Ty and, respectively, between the value Tx' and the value Ty', also the following relation (J) is substantially satisfied $$\frac{Dt}{st} = \frac{\frac{Dc(T)}{sc(T)}*Lc + \frac{Dc(T')}{sc(T')}*Lc'}{Lc+Lc'}.$$

11. A unit according to claim 9, wherein, for compensating at the preselected wavelength λ and as temperatures T, T' vary, also values, comprised in a preselected interval of values, of a Dt/st ratio between the chromatic dispersion coefficient Dt and a chromatic dispersion slope st, the hole diameter and pitch of the first and second holey fibre, the lengths Lc and Lc' and the intervals of temperature Tx-Ty and Tx'-Ty' are also selected so that, at the preselected wavelength λ, the first and second holey optical fibres have such values of the chromatic dispersion slope sc(T) and, respectively, sc(T') and such values of the chromatic dispersion coefficient Dc(T) and, respectively, Dc(T') in function of the temperatures T and T' that, as the temperatures T, T' vary in a predetermined manner between the value Tx and the value Ty and, respectively, between the value Tx' and the value Ty', also the following relation (J) is substantially satisfied $$\frac{Dt}{st} = \frac{\frac{Dc(T)}{sc(T)}*Lc + \frac{Dc(T')}{sc(T')}*Lc'}{Lc + Lc'}$$

for all values of the Dt/st ratio comprised in said preselected interval of values.

12. A unit according to claim 7, wherein, the cladding region of the second holey optical fibre defines a first ring of holes around the core region.

13. A unit according to claim 12, wherein the holes of said first ring have a mean diameter d' and are spaced from one another by a mean pitch Λ'.

14. A unit according to 13, having a d/Λ ratio of the first holey optical fibre and a d'/Λ' ratio of the second holey optical fibre which are different from each another.

15. An optical communication line comprising
a portion of optical transmission fibre having a length Lt and a chromatic dispersion coefficient Dt at a wavelength λ; and
a unit comprising:
in turn, a portion of holey optical fibre having a predetermined length Lc and comprising a core region and a cladding region, said cladding region comprising, in turn, a plurality of holes passing through it longitudinally, said holes having a respective hole diameter and being spaced, two by two, according to a respective pitch; and
a temperature adjusting device for bringing and maintaining the holey optical fibre at a temperature value Tz selectable in a predetermined interval of temperatures Tx-Ty;
wherein the hole diameter and pitch, the length Lc, the temperature value Tz and the interval of temperatures Tx-Ty are selected so that the holey optical fibre has such value of the chromatic dispersion coefficient Dc(Tz) at the preselected wavelength λ and at the temperature value Tz, as to compensate the chromatic dispersion of the optical transmission fibre portion.

16. An optical communication line according to claim 15, wherein the hole diameter and pitch, the length Lc, the temperature value Tz and the interval of temperatures Tx-Ty are selected so that the chromatic dispersion coefficient Dc(Tz) has such value as to substantially satisfy the following relation Dt*Lt=−Dc(Tz)*Lc.

17. An optical communication line according to claim 15, wherein
the portion of optical transmission fibre, at wavelength λ, also has a chromatic dispersion slope st, and
in the unit, the hole diameter and pitch, the length Lc, the temperature value Tz and the interval of temperature Tx-Ty are also selected so that the holey optical fibre has such value of the chromatic dispersion slope sc(Tz) and such value of the chromatic dispersion coefficient Dc(Tz) at the preselected wavelength λ and at the temperature value Tz, that also the following relation Dt/st=DC(Tz)/sc(Tz) is substantially satisfied, so as to substantially compensate also the chromatic dispersion slope of the optical transmission fibre portion.

18. An optical communication line according to any one of claims 15 to 17, wherein the portion of optical transmission fibre has a chromatic dispersion Dt*Lt variable in a predetermined interval of values, and the hole diameter and pitch, the length Lc and the interval of temperatures Tx-Ty are selected so that at the preselected wavelength λ, the holey optical fibre has such values of chromatic dispersion coefficient Dc(T) in function of the temperature that, as temperature T varies between the value Tx and the value Ty, the following relation Dt*Lt=−DC(T)*Lc is substantially satisfied for all chromatic dispersion values Dt*Lt comprised in said predetermined interval of values.

19. An optical communication line according to claim 16, wherein the unit also comprises a second portion of holey optical fibre having a predetermined length Lc' comprising a core region and a cladding region, said cladding region comprising, in turn, a plurality of holes passing through it longitudinally, said holes having a respective diameter and being spaced, two by two, according to a respective pitch.

20. An optical communication line according to claim 19, wherein the temperature adjusting device is also suitable for bringing and maintaining the second holey optical fibre at a temperature value Tz' selectable in a second, predetermined interval of temperatures Tx'-Ty'.

21. An optical communication line according to claim 20, wherein for compensating at the preselected wavelength λ, the chromatic dispersion Dt*Lt of the optical transmission fibre portion, the hole diameter and pitch of the first and second holey fibres, the lengths Lc and Lc', the values of temperature Tz and Tz' and the intervals of temperature Tx-Ty and Tx'=Ty' are selected so that at the preselected wavelength λ, the first and the second holey optical fibres have such values of the chromatic dispersion coefficient Dc(Tz) and, respectively, Dc(Tz') that the following relation is substantially satisfied $$Dt*Lt=-[Dc(Tz)*Lc+Dc(Tz)*Lc'].$$

22. An optical communication line according to claim 21 wherein
the optical transmission fibre portion has, at the preselected wavelength λ, also a slope of the chromatic dispersion st, and
in the unit, the hole diameter and pitch of the first and second holey fibres, the lengths Lc the Lc', the values of temperature Tz and Tz' and the intervals of temperature Tx-Ty and Tx'-Ty' are also selected so that at the preselected wavelength λ, the first and the second holey optical fibres, have such values of the chromatic dispersion slope sc(Tz) and, respectively, sc(Tz'), and such values of the chromatic dispersion coefficient Dc(Tz) and, respectively, Dc(Tz'), that also the following relation is substantially satisfied $$\frac{Dt}{st} = \frac{\frac{Dc(Tz)}{sc(Tz)}*Lc + \frac{Dc(Tz')}{sc(Tz')}*Lc'}{Lc + Lc'}$$

so as to compensate, at the preselected wavelength λ, also the chromatic dispersion slope st of the optical transmission fibre portion.

23. An optical communication line according to claim 20, 21 or 22, wherein the optical transmission fibre portion has also a chromatic dispersion Dt*Lt variable in a predetermined interval of values, and the hole diameter and pitch of the first and second holey fibres, the lengths Lc and Lc', and the intervals of temperature Tx-Ty and Tx'-Ty' are selected so that at the preselected wavelength λ, the first and the second holey optical fibres have such values of the chromatic dispersion coefficient Dc(T) and, respectively, Dc(Tλ), as temperatures T, T' vary, in a predetermined manner, between the values Tx and the value Ty, and respectively, Tx' and Ty', that the following relation (K) is substantially satisfied $$Dt*Lt=-[Dc(T)*Lc+Dc(T')*Lc']$$

for all values of chromatic dispersion Dt*Lt comprised in the predetermined interval of values.

24. An optical communication line according to claim 23, wherein the optical transmission fibre portion also has a Dt/st ratio variable in a preselected interval of values, and the hole diameter and pitch of the first and second holey fibres, the lengths Lc and Lc' and the intervals of temperature Tx-Ty and Tx'-Ty' are also selected so that, at the preselected wavelength λ, the first and the second holey optical fibres have such values of the chromatic dispersion slope sc(T) and, respectively, sc(T') and such values of the chromatic dispersion coefficient Dc(T) and, respectively, Dc(T') that, as the temperatures T and T' vary in said predetermined manner between the value Tx and the value Ty and, respectively, between the value Tx' and the value Ty', also the following relation (J) is substantially satisfied $$\frac{Dt}{st} = \frac{\frac{Dc(T)}{sc(T)}*Lc + \frac{Dc(T')}{sc(T')}*Lc'}{Lc+Lc'}$$

for all values of the Dt/st ratio comprised in said preselected interval of values.

25. An optical communication system comprising:

a transmitting station suitable for providing an optical signal having a signal wavelength λ;

an optical communication line, optically connected to said transmitting station, for transmitting said optical signal, said line comprising at least one portion of optical transmission fibre, having a length Lt and a chromatic dispersion coefficient Dt at wavelength λ, and a unit comprising, in turn, a portion of holey optical fibre having a predetermined length Lc and comprising a core region and a cladding region, said cladding region comprising, in turn, a plurality of holes passing through it longitudinally, said holes having a respective diameter and being spaced, two by two, according to a respective pitch; and a receiving station, optically connected to said optical communication line, for receiving said optical signal, said unit comprising a temperature adjusting device for bringing and maintaining the holey optical fibre at a temperature value Tz selectable in a predetermined interval of temperatures Tx-Ty, wherein the hole diameter and pitch, the length Lc, the temperature value Tz and the interval of temperatures Tx-Ty are selected so that the holey optical fibre has such value of the chromatic dispersion coefficient Dc(Tz) at the preselected wavelength λ and at the temperature value Tz, as to compensate the chromatic dispersion of the optical transmission fibre portion.

26. A method for compensating chromatic dispersion in a reconfigurable manner, comprising:

a) providing a holey optical fibre having a length Lc and comprising a core region and a cladding region, said cladding region comprising, in turn, a plurality of holes passing through it longitudinally, said holes having a respective diameter and being spaced, two by two, according to a respective pitch; and b) bringing and maintaining said holey optical fibre at a temperature T selectable in a predetermined interval of temperatures Tx-Ty so that the holey optical fibre has a desired chromatic dispersion value Dc(T), the interval being predetermined based on at least the diameter and the pitch.

27. A unit according to claim 2, wherein the ratio between the area taken by the holes of the first ring of holes and the total area of a circular crown defined by said first ring of holes is more than 0.5.

28. A unit comprising:

a portion of holey optical fibre having a length Lc comprising a core region and a cladding region, said cladding region comprising a plurality of holes passing longitudinally through the cladding region, said plurality of holes each having a respective diameter and being spaced, two by two, according to a respective pitch; and a temperature adjusting device for bringing and maintaining the portion of holey optical fibre at temperature values T selectable in an interval of temperatures Tx-Ty, the interval being predetermined based on at least the diameter and the pitch, wherein the cladding region of the portion of holey optical fibre comprises a first ring of holes around the core region and wherein the ratio between the area taken by the holes of the first ring of holes and the total area of a circular crown defined by said first ring of holes is more than 0.5.

* * * * *